United States Patent
Hayashi et al.

(10) Patent No.: US 6,767,611 B2
(45) Date of Patent: Jul. 27, 2004

(54) BLACK MAGNETIC ACICULAR CONTAINING COMPOSITE PARTICLES MAGNETIC RECORDING MEDIUM

(75) Inventors: Kazuyuki Hayashi, Hiroshima (JP); Hiroko Morii, Hiroshima (JP); Mamoru Kamigaki, Kure (JP); Yasuyuki Tanaka, Onoda (JP); Keisuke Iwasaki, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 89 days.

(21) Appl. No.: 10/152,345

(22) Filed: May 22, 2002

(65) Prior Publication Data

US 2003/0027018 A1 Feb. 6, 2003

Related U.S. Application Data

(63) Continuation-in-part of application No. 09/710,834, filed on Nov. 14, 2000.

(30) Foreign Application Priority Data

May 25, 2001 (JP) ........................................ 2001-143242
May 25, 2001 (JP) ........................................ 2001-143243

(51) Int. Cl.[7] .............................................. G11B 5/706
(52) U.S. Cl. ....................... 428/141; 428/328; 428/329; 428/403; 428/404; 428/405; 428/406; 428/447; 428/694 BA

(58) Field of Search .................................. 428/141, 328, 428/329, 403, 404, 405, 446, 447, 694 BA

(56) References Cited

U.S. PATENT DOCUMENTS

| 4,076,890 A | 2/1978 | Yamada et al. |
| 4,415,630 A | 11/1983 | Kubota et al. |
| 6,294,242 B1 * | 9/2001 | Hayashi et al. ............. 428/141 |

FOREIGN PATENT DOCUMENTS

| EP | 0 957 474 | 11/1999 |
| EP | 0 982 715 | 3/2000 |

* cited by examiner

*Primary Examiner*—Stevan A. Resan
(74) *Attorney, Agent, or Firm*—Nixon & Vanderhye P.C.

(57) ABSTRACT

A magnetic recording medium using black magnetic acicular composite particles produced by forming a single carbon black coat between the surface of magnetic acicular cobalt-coated iron oxide particle or magnetic acicular metal particle and a coating comprising at least one organosilicon compound, in an amount of from more than 10 to 40 parts by weight based on 100 parts by weight of the magnetic acicular particles, exhibits not only a smooth surface, a smaller light transmittance and a lower surface electrical resistivity value, but also a small friction coefficient and an excellent running durability.

20 Claims, No Drawings

BLACK MAGNETIC ACICULAR CONTAINING COMPOSITE PARTICLES MAGNETIC RECORDING MEDIUM

CROSS REFERENCE TO RELATED APPLICATION

This is a continuation-in-part of application Ser. No. 09/710,834 filed Nov. 14, 2000.

BACKGROUND OF THE INVENTION

The present invention relates to magnetic acicular composite particles for magnetic recording medium, and a magnetic recording medium using the black magnetic acicular composite particles. More particularly, the present invention relates to magnetic acicular composite particles exhibiting not only an excellent dispersibility in vehicle due to a less amount of carbon black desorbed or fallen-off from the surfaces thereof, but also a more excellent blackness, a lower volume resistivity value and a well-controlled myristic acid-adsorption; and a magnetic recording medium exhibiting not only a smooth surface, a smaller light transmittance and a lower surface electrical resistivity value, but also a small friction coefficient and an excellent running durability.

With a development of miniaturized, lightweight video or audio magnetic recording and reproducing apparatuses for long-time recording, magnetic recording media such as a magnetic tape and magnetic disk have been increasingly and strongly desired to have a higher performance, namely, a higher recording density, higher output characteristic, in particular, an improved frequency characteristic and a lower noise level.

Especially, video tapes have recently been desired more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

In order to enhance output characteristics of magnetic recording media, especially an S/N ratio thereof with respect to signals having a short wavelength, there have been demanded fineness of magnetic particles, reduction in thickness of a magnetic recording layer, high dispersibility of magnetic particles and surface smoothness of a magnetic coating film.

On the other hand, at the present time, the end position of a magnetic recording medium such as magnetic tapes has been detected by sensing a high light transmittance portion of the magnetic recording medium by means of a video deck. In the case where the particle size of magnetic particles dispersed in the magnetic recording layer become finer and the thickness of the magnetic recording medium is reduced in order to meet the requirement for high performance of the magnetic recording medium as described hereinbefore, the magnetic recording medium shows a high light transmittance as a whole, so that it has been difficult to detect the end position thereof by means of the video deck. In order to solve this problem, carbon black fine particles have been added to the magnetic recording layer in an amount of usually about 6 to 12 parts by weight based on 100 parts by weight of the magnetic particles, thereby reducing the light transmittance of the magnetic recording medium. For this reason, in current videotapes, it is essential to add carbon black fine particles, etc., to the magnetic recording layer thereof.

However, when a large amount of such non-magnetic carbon black fine particles are added to the magnetic recording layer, the magnetic recording medium suffers from deterioration in signal recording property, thereby hindering high-density recording thereon, and the reduction in thickness of the magnetic recording layer becomes incapable. Further, due to the fact that the carbon black fine particles have an average particle size as fine as 0.002 to 0.05 μm and a large BET specific surface area value, and are deteriorated in solvent-wettability, it has been difficult to disperse these carbon black fine particles in vehicle, thereby failing to obtain a magnetic recording medium having a smooth surface.

Further, in the case where the magnetic recording medium has a high surface electrical resistivity, the electrostatic charge amount thereof is increased, so that cut chips or dusts tend to adhere onto the surface of the magnetic recording medium upon the production or use thereof, thereby causing such a problem that the dropout frequently occurs. Therefore, in order to reduce not only the light transmittance of the magnetic recording medium but also the surface electrical resistivity thereof, especially below about $10^8$ $\Omega/cm^2$, the carbon black fine particles have been conventionally added to the magnetic recording layer of the magnetic recording medium.

However, as described above, in the case where the amount of such carbon black fine particles or the like which do not contribute to magnetic properties of the magnetic recording layer, is increased, there are caused such problems that the magnetic recording medium suffers from deterioration in signal recording property, the reduction in thickness of the magnetic recording layer becomes incapable, and further the surface smoothness of the magnetic recording layer is deteriorated.

Also, since the carbon black fine particles are bulky particles having a bulk density as low as about 0.1 g/cm³, the handling property and workability thereof are deteriorated. In addition, it has been pointed out that the use of such carbon black fine particles causes problems concerning safety and hygiene such as carcinogenesis.

Magnetic recording media have been continuously required to enhance performances thereof. In particular, it has been strongly required to improve physical properties of these magnetic recording media such as running property in addition to the above-described high-density recording property.

The running property of magnetic recording media (tapes) can be ensured by adding a fatty acid such as myristic acid or stearic acid (hereinafter referred to merely as "myristic acid") in an amount of usually about 0.5 to 5% by weight based on the weight of magnetic particles, into a recording layer generally formed as an upper layer of the respective magnetic recording medium, and then allowing the myristic acid to be gradually oozed out on the surface of the magnetic recording layer so as to render the surface slidable.

When the amount of the myristic acid oozed out on the surface of the magnetic recording layer is too small, it is not possible to ensure a good running property of the magnetic recording media. On the contrary, when a large amount of the myristic acid is added to the magnetic recording layer so as to allow a large amount of myristic acid to be subsequently oozed out on the surface thereof, the myristic acid is preferentially adsorbed onto the surface of each magnetic particle dispersed in the magnetic recording layer, thereby inhibiting the magnetic particles from being contacted with or adsorbed into resins. As a result, it is difficult to disperse the magnetic particles in vehicle. Also, the increase in amount of the myristic acid as a non-magnetic component causes deterioration in magnetic properties of the magnetic recording media. Further, since the myristic acid acts as a plasticizer, there arise problems such as deterioration in mechanical strength of the magnetic recording media.

Recently, with further reduction in thickness of the magnetic recording layer, the absolute amount of myristic acid added to the magnetic recording layer is decreased. In addition, since the particle size of the magnetic particles have become much finer in order to meet the requirement of high-density recording, the BET specific surface area thereof is increased, so that a large amount of myristic acid is absorbed onto the surfaces of the magnetic particles. Under these conditions, it is more and more difficult to properly adjust the amount of the myristic acid oozed out on the surface of the magnetic recording layer by the amount of the myristic acid added into the magnetic recording layer, thereby ensuring a good running property of the magnetic recording layer.

Accordingly, it has been strongly required to properly adjust the amount of myristic acid oozed out on the surface of the magnetic recording layer and ensure a good running property of the magnetic recording media.

In order to improve electrical resistance and running durability of the magnetic recording media, there have been proposed such magnetic particles on the surfaces of which carbon and/or graphite are deposited or adhered in an amount of 0.2 to 10.0% by weight based on the weight of the magnetic particles (corresponding to 0.2 to 11.11 parts by weight based on 100 parts by weight of the magnetic particles) by various methods such as gas-phase growth, e.g., chemical vapor deposition (CVD) or physical vapor deposition (PVD), reduction of organic compounds, and thermal decomposition or incomplete combustion of hydrocarbons (Japanese Patent Application Laid-Open (KOKAI) No. 10-269558(1998)).

Also, hitherto, with the reduction in thicknesses of magnetic recording layer and non-magnetic base film of magnetic recording media, it has been variously attempted to impart good surface smoothness and large stiffness thereto by improving a substrate on which the magnetic recording layer is formed. For instance, there has been proposed a non-magnetic substrate composed of a non-magnetic base film and at least one undercoat layer formed on the non-magnetic base film. The undercoat layer is composed of a binder and non-magnetic particles dispersed in the vehicle, which contain iron as a main component, e.g., acicular hematite particles or acicular iron oxide hydroxide particles (hereinafter referred to merely as "non-magnetic undercoat layer"). Such a non-magnetic substrate is already put into practice (refer to Japanese Patent Publication (KOKOKU) No. 6-93297(1994), Japanese Patent Application Laid-Open (KOKAI) Nos. 62-159338(1987), 63-187418(1988), 4-167225(1992), 4-325915(1992), 5-73882(1993), 5-182177(1993), 5-347017(1993) and 6-60362(1994), or the like).

As non-magnetic particles for the non-magnetic undercoat layer, there have been known non-magnetic particles which are treated with a hydroxide of aluminum, an oxide of aluminum, a hydroxide of silicon or an oxide of silicon in order to improve a dispersibility of these particles in vehicle, etc., for further smoothening the surface of a substrate and increasing the stiffness thereof (Japanese Patent Nos. 2,571, 350 and 2,582,051, and Japanese Patent Application Laid-Open (KOKAI) Nos. 6-60362(1994), 9-22524(1997) and 9-27117(1997)).

Also, in order to reduce a light transmittance of magnetic recording media by reducing the amount of carbon black added to a magnetic recording layer thereof, it has been known to use as non-magnetic particles for non-magnetic undercoat layer, blackish brown acicular hematite particles or blackish brown acicular iron oxide hydroxide particles (Japanese Patent Application Laid-Open (KOKAI) Nos. 7-66020(1995), 8-259237(1996) and 9-167333(1997) or the like). Further, it has been known to use non-magnetic acicular particles which are composed of acicular hematite particles or acicular iron oxide hydroxide particles as core particles and carbon black fine particles adhered onto the surfaces of the core particles in an amount of 1 to 20 parts by weight based on 100 parts by weight of the core particles (European Patent No. 0,824,690 A).

Also, it has been known that mixed particles composed of non-magnetic iron oxide particles and carbon black particles are used as non-magnetic particles for non-magnetic undercoat layer in order to reduce the surface electrical resistivity value of magnetic recording media (Japanese Patent Application Laid-Open (KOKAI) Nos. 1-213822(1989), 1-300419(1989), 6-236542(1994) and 9-297911(1997) or the like).

At present, it has been strongly demanded to provide magnetic recording media which exhibit not only a smooth surface, a smaller light transmittance and a lower surface electrical resistivity value, but also a small friction coefficient and an excellent running durability. However, magnetic recording media satisfying all of these properties have not been obtained until now.

As a result of the present inventors' earnest studies in view of the above problems, it has been found that by using as magnetic particles for magnetic recording medium, black magnetic acicular composite particles comprising:

as core particles magnetic acicular cobalt-coated iron oxide particles or magnetic acicular metal particles containing iron as a main component;

a coating formed on surface of the core particle, comprising at least one organosilicon compound selected from the group consisting of:

(1) organosilane compounds obtainable from alkoxysilane compounds, and (2) polysiloxane or modified polysiloxane; and a single carbon black coat (carbon black-coating monolayer) formed on the coating layer comprising the organosilicon compound, in an amount of from more than 10 to 40 parts by weight based on 100 parts by weight of said core particles, the obtained magnetic recording medium can exhibit not only a smooth surface, a smaller light transmittance and a lower surface electrical resistivity value, but also a small friction coefficient and an excellent running durability. The present invention has been attained based on this finding.

SUMMARY OF THE INVENTION

An object of the present invention is to provide a magnetic recording medium exhibiting not only a smooth surface, a smaller light transmittance and a lower surface electrical resistivity value, but also a small friction coefficient and an excellent running durability.

Another object of the present invention is to provide magnetic acicular particles exhibiting not only an excellent dispersibility in vehicle due to a less amount of carbon black desorbed or fallen-off from the surfaces thereof, but also a more excellent blackness, a lower volume resistivity value and a well-controlled myristic acid-adsorption.

To accomplish the aims, in a first aspect of the present invention, there is provided a magnetic recording medium comprising:

a non-magnetic base film; and a magnetic recording layer formed on the non-magnetic base film, comprising a binder resin and black magnetic acicular composite particles having an average particle diameter of 0.051 to 0.35 μm, which black magnetic acicular composite particles comprise:

as magnetic acicular particles, magnetic acicular cobalt-coated iron oxide particles or magnetic acicular metal particles containing iron as a main component a coating formed on surface of the magnetic acicular particles, comprising at least one organosilicon compound selected from the group consisting of:

(1) organosilane compounds obtainable from alkoxysilane compounds, and (2) polysiloxanes or modified polysiloxanes and a single carbon black coat formed on the coating layer comprising the organosilicon compound, in an amount from more than 10 to 40 parts by weight based on 100 parts by weight of said magnetic acicular particles.

In a second aspect of the present invention, there is provided a magnetic recording medium comprising:

a non-magnetic base film; and a magnetic recording layer formed on the non-magnetic base film, comprising a binder resin and black magnetic acicular composite particles having an average particle diameter of 0.051 to 0.35 μm. which black magnetic acicular composite particles comprise:

as magnetic acicular particles, magnetic acicular cobalt-coated iron oxide particles or magnetic acicular metal particles containing iron as a main component, which have a coat formed on at least a part of the surface of the magnetic acicular particle, comprising at least one compound selected from the group consisting of hydroxides of aluminum, oxides of aluminum, hydroxides of silicon and oxides of silicon in amount of 0.01 to 20% by weight, calculated as Al or $SiO_2$, based on the weight of the magnetic acicular particles coated, a coating layer formed on surface of the coat on the magnetic acicular particles, comprising at least one organosilicon compound selected from the group consisting of:

(1) organosilane compounds obtained obtainable from alkoxysilane compounds, and (2) polysiloxanes or modified polysiloxanes, and a single carbon black coat formed on the said coating layer comprising the said organosilicon compound, in an amount of from more than 10 to 40 parts by weight based on 100 parts by weight of the said magnetic acicular particles.

In a third aspect of the present invention, there is provided a magnetic recording medium comprising:

a non-magnetic base film;

a non-magnetic undercoat layer formed on the non-magnetic base film; and a magnetic recording layer formed on the non-magnetic undercoat layer, comprising a binder resin and black magnetic acicular composite particles having an average particle diameter of 0.051 to 0.35 μm, which black magnetic acicular composite particles comprise:

as magnetic acicular particles, magnetic acicular cobalt-coated iron oxide particles or magnetic acicular metal particles containing iron as a main component, a coating formed on surface of said magnetic acicular particles, comprising at least one organosilicon compound selected from the group consisting of:

(1) organosilane compounds obtainable from alkoxysilane compounds, and (2) polysiloxanes or modified polysiloxanes, and a single carbon black coat formed on the coating layer comprising said organosilicon compound, in an amount of from more than 10 to 40 parts by weight based on 100 parts by weight of the magnetic acicular particles.

In a fourth aspect of the present invention, there is provided a magnetic recording medium comprising:

a non-magnetic base film;

a non-magnetic undercoat layer formed on the non-magnetic base film; and a magnetic recording layer formed on the non-magnetic undercoat layer, comprising a binder resin and black magnetic acicular composite particles having an average particle diameter of 0.051 to 0.35 μm, which black magnetic acicular composite particles comprise:

as magnetic acicular particles, magnetic acicular cobalt-coated iron oxide particles or magnetic acicular metal particles containing iron as a main component, which have a coat formed on at least a part of the surface of the magnetic acicular particle, comprising at least one compound selected from the group consisting of hydroxides of aluminum, oxides of aluminum, hydroxides of silicon and oxides of silicon in amount of 0.01 to 20% by weight, calculated as Al or $SiO_2$, based on the weight of the magnetic acicular particles coated, a coating layer formed on surface of the coat on the magnetic acicular particles, comprising at least one organosilicon compound selected from the group consisting of:

(1) organosilane compounds obtained obtainable from alkoxysilane compounds, and (2) polysiloxanes or modified polysiloxanes, and a single carbon black coat formed on the said coating layer comprising the said organosilicon compound, in an amount of from more than 10 to 40 parts by weight based on 100 parts by weight of the said magnetic acicular particles.

In a fifth aspect of the present invention, there are provided black magnetic acicular composite particles for a magnetic recording medium, having an average particle diameter of 0.051 to 0.35 μm, comprising:

as magnetic acicular particles, magnetic acicular cobalt-coated iron oxide particles or magnetic acicular metal particles containing iron as a main component, a coating formed on surface of said magnetic acicular particles, comprising at least one organosilicon compound selected from the group consisting of:

(1) organosilane compounds obtainable from alkoxysilane compounds, and (2) polysiloxanes or modified polysiloxanes, and a single carbon black coat formed on said coating layer comprising said organosilicon compound, in an amount of from more than 10 to 40 parts by weight based on 100 parts by weight of said magnetic acicular particles.

In a sixth aspect of the present invention, there are provided black magnetic acicular composite particles for a magnetic recording medium, having an average particle diameter of 0.051 to 0.35 µm, comprising:

as magnetic acicular particles, magnetic acicular cobalt-coated iron oxide particles or magnetic acicular metal particles containing iron as a main component, which have a coat formed on at least a part of the surface of the magnetic acicular particle, comprising at least one compound selected from the group consisting of hydroxides of aluminum, oxides of aluminum, hydroxides of silicon and oxides of silicon in amount of 0.01 to 20% by weight, calculated as Al or $SiO_2$, based on the weight of the magnetic acicular particles coated, a coating layer formed on surface of the coat on the magnetic acicular particles, comprising at least one organosilicon compound selected from the group consisting of:

(1) organosilane compounds obtainable from alkoxysilane compounds, and (2) polysiloxanes or modified polysiloxanes, and a single carbon black coat formed on the coating layer comprising said organosilicon compound, in an amount of from more than 10 to 40 parts by weight based on 100 parts by weight of the said magnetic acicular particles.

DETAILED DESCRIPTION OF THE INVENTION

The present invention will be described in detail below.

First, the magnetic recording medium according to the present invention is described.

The magnetic recording medium according to the present invention has the following constructions.

(1) A magnetic recording medium comprises a non-magnetic base film; and a magnetic recording layer formed on the non-magnetic base film, which comprises as magnetic particles, black magnetic acicular composite particles and a binder resin.

(2) A magnetic recording medium comprises a non-magnetic base film; a non-magnetic undercoat layer formed on the non-magnetic base film, which comprises non-magnetic particles and a binder resin; and a magnetic recording layer formed on the non-magnetic undercoat layer, which comprises as magnetic particles, black magnetic acicular composite particles and a binder resin.

The black magnetic acicular composite particles having an average particle diameter of 0.051 to 0.35 µm according to the present invention, comprise magnetic acicular particle as a core particle, a coating layer comprising an organosilicon compound which is formed on the surface of each magnetic acicular particle, and a single carbon black coat layer which are formed on the coating layer comprising the organosilicon compound.

As the magnetic acicular particles used as core particles in the present invention, there may be exemplified (a) magnetic acicular cobalt-coated iron oxide particles obtained by coating with cobalt, both cobalt and iron or the like the surface of as acicular magnetite particles ($Fe_3O_4$), acicular maghemite particles ($\gamma$-$Fe_2O_3$), acicular berthollide compounds particles ($FeO_x \cdot Fe_2O_3$; $0<X<1$) which are intermediate oxides between maghemite and magnetite (hereinafter referred to merely as "magnetic acicular cobalt-coated iron oxide particles"); magnetic acicular metal particles containing iron as a main component which contain elements other than Fe such as Co, Al, Ni, P, Zn, Si, B or rare earth elements (hereinafter referred to merely as "magnetic acicular metal particles") (which may include magnetic acicular iron alloy particles containing elements other than Fe such as Co, Al, Ni, P, Zn, Si, B or rare earth elements); or the like.

More specifically, the magnetic acicular metal particles may be exemplified as follows.

1) Magnetic acicular metal particles comprises iron; and cobalt of usually 0.05 to 40% by weight, preferably 1.0 to 35% by weight, more preferably 3 to 30% by weight (calculated as Co) based on the weight of the magnetic acicular metal particles.

2) Magnetic acicular metal particles comprises iron; and aluminum of usually 0.05 to 10% by weight, preferably 0.1 to 7% by weight (calculated as Al) based on the weight of the magnetic acicular metal particles.

3) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and aluminum of usually 0.05 to 10% by weight, preferably 0.1 to 7% by weight (calculated as Al) based on the weight of the magnetic acicular metal particles.

4) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

5) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

6) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

7) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

8) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

9) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

10) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

11) Magnetic acicular metal particles comprises iron; aluminum of usually 0.05 to 10% by weight, preferably 0.1 to 7% by weight (calculated as Al) based on the weight of the magnetic acicular metal particles; at least one selected from the group consisting of Nd, La and Y of ordinarily 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

12) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

The iron content in the magnetic acicular metal particles is the balance, and is preferably 50 to 99% by weight, more preferably 60 to 95% by weight (calculated as Fe) based on the weight of the magnetic acicular metal particles.

The core particles used in the present invention have an acicular shape. Meanwhile, the "acicular" used herein means "spindle-shaped", "rice grain-like" or the like in addition to literally "acicular or needle-like".

As to the particle size of the magnetic acicular particles used in the present invention, the average major axial diameter thereof is preferably 0.05 to 0.34 $\mu$m, more preferably 0.05 to 0.33 $\mu$m, still more preferably 0.05 to 0.32 $\mu$m.

When the average major axis diameter of the magnetic acicular particles is more than 0.34 $\mu$m, the obtained black magnetic acicular composite particles also may become large particles. In the case where such large particles are used for forming a magnetic recording layer, the surface smoothness of the magnetic recording layer tends to be deteriorated. On the other hand, when the average particle size is less than 0.05 $\mu$m, the intermolecular force between the particles may be increased due to the reduction in particle size, so that agglomeration of the particles tends to be caused. Therefore, it becomes difficult to uniformly coat the surfaces of the magnetic acicular particle with the organosilicon compound, and to uniformly form the carbon black coat on the surface of the coating layer comprising the organosilicon compounds.

The average minor axis diameter of the magnetic acicular particles as core particles used in the present invention is preferably 0.0025 to 0.17 $\mu$m, more preferably 0.0025 to 0.165 $\mu$m, still more preferably 0.0025 to 0.16 $\mu$m.

The aspect ratio of the magnetic acicular particles as core particles used in the present invention (=average major axis diameter:average minor axis diameter, hereinafter referred to merely as "aspect ratio") is usually 2.0:1 to 20.0:1, preferably 2.5:1 to 18.0:1, more preferably 3.0:1 to 15.0:1. When the aspect ratio is more than 20.0:1, the magnetic acicular particles may tend to be entangled with each other, and it also may become difficult to uniformly coat the surfaces of the magnetic acicular particles with the organosilicon compounds and to uniformly form the carbon black coat on the surface of the coating layer comprising the organosilicon compounds. On the other hand, when the aspect ratio is less than 2.0:1, the strength of the coating film of the magnetic recording medium may be low.

The geometrical standard deviation value of the major axis diameter of the magnetic acicular particles as core particles used in the present invention is usually not more than 2.0, preferably not more than 1.8, more preferably not more than 1.6. When the geometrical standard deviation value thereof is more than 2.0, coarse particles may be contained therein, so that the magnetic acicular particles may be inhibited from being uniformly dispersed. Therefore, it may also become difficult to uniformly coat the surfaces of the magnetic acicular particles with the organosilicon compounds and to uniformly form the carbon black coat on the surface of the coating layer comprising the organosilicon compounds. The lower limit of the geometrical standard deviation value is 1.01. It is industrially difficult to obtain particles having a geometrical standard deviation value of less than 1.01.

The BET specific surface area of the magnetic acicular particles as core particles used in the present invention is usually 20 to 150 $m^2/g$, preferably 25 to 120 $m^2/g$, more preferably 28 to 100 $m^2/g$. When the BET specific surface area is less than 20 $m^2/g$, the magnetic acicular particles may become coarse, or the sintering between the particles may be caused, so that the obtained black magnetic acicular composite particles also may become coarse particles and tend to be deteriorated in smooth surface of the magnetic recording layer. When the BET specific surface area value is more than 150 $m^2/g$, the particles may tend to be agglomerated together due to the increase in intermolecular force between the particles because of the fineness thereof, so that it may become difficult to uniformly coat the surfaces of the magnetic acicular particles with the organosilane compounds and to uniformly form the carbon black coat on the surface of the coating layer comprising the organosilicon compounds.

The blackness of the magnetic acicular particles as core particles used in the present invention, is usually more than 18.0 when represented by L* value, and the upper limit thereof is usually 34.0, preferably 32.0 when represented by L* value. When the L* value exceeds 34.0, the lightness of the particles may be high, so that it may be difficult to obtain black magnetic acicular composite particles having a sufficient blackness.

The volume resistivity value of the core particles is usually not less than $5 \times 10^{10}$ Ω·cm, preferably $1 \times 10^6$ to $1 \times 10^{10}$ Ω·cm.

The myristic acid-adsorption of the core particles is usually 0.4 to 1.5, preferably 0.4 to 1.2 mg/m².

As to the magnetic properties of the magnetic acicular particles as core particles used in the present invention, the coercive force value thereof is usually 500 to 3500 Oe (39.8 to 278.5 kA/m), the saturation magnetization value is usually 60 to 170 emu/g (60 to 170 Am²/kg).

In case of magnetic acicular cobalt-coated iron oxide particles, the coercive force value thereof is usually 500 to 1700 Oe (39.8 to 135.3 kA/m), preferably 550 to 1700 Oe (43.8 to 135.3 kA/m); the saturation magnetization value is usually 60 to 90 emu/g (60 to 90 Am²/kg), preferably 65 to 90 emu/g (65 to 90 Am²/kg). In case of magnetic acicular metal particles containing iron as a main component, the coercive force value thereof is usually 800 to 3500 Oe (63.7 to 278.5 kA/m), preferably 900 to 3500 Oe (71.6 to 278.5 kA/m); the saturation magnetization value is usually 90 to 170 emu/g (90 to 170 Am²/kg), preferably 100 to 170 emu/g (100 to 170 Am²/kg).

The coating formed on the surface of the core particle comprises at least one organosilicon compound selected from the group consisting of (1) organosilane compounds obtainable from alkoxysilane compounds; and (2) polysiloxanes and modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes").

The organosilane compounds (1) may be produced by drying or heat-treating alkoxysilane compounds represented by the formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

The drying or heat-treatment of the alkoxysilane compounds may be conducted, for example, at a temperature of usually 40 to 200° C., preferably 60 to 150° C. for usually 10 minutes to 12 hours, preferably 30 minutes to 3 hours.

Specific examples of the alkoxysilane compounds may include methyltriethoxysilane, dimethyldiethoxysilane, phenyltriethyoxysilane, diphenyldiethoxysilane, methyltrimethoxysilane, dimethyldimethoxysilane, phenyltrimethoxysilane, diphenyldimethoxysilane, isobutyltrimethoxysilane, decyltrimethoxysilane or the like. Among these alkoxysilane compounds, in view of the desorption percentage and the adhering effect of carbon black, methyltriethoxysilane, phenyltriethyoxysilane, methyltrimethoxysilane, dimethyldimethoxysilane and isobutyltrimethoxysilane are preferred, and methyltriethoxysilane and methyltrimethoxysilane are more preferred.

As the polysiloxanes (2), there may be used those compounds represented by the formula (II):

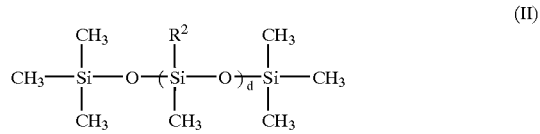

wherein $R^2$ is H— or $CH_3$—, and d is an integer of 15 to 450.

Among these polysiloxanes, in view of the desorption percentage and the adhering effect of carbon black, polysiloxanes having methyl hydrogen siloxane units are preferred.

As the modified polysiloxanes (2-A), there may be used:

(a) polysiloxanes modified with polyethers represented by the formula (III):

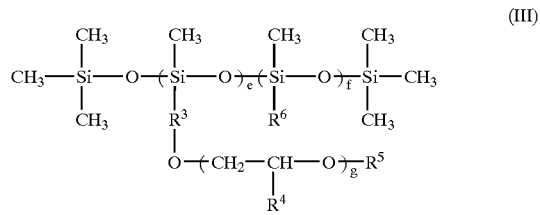

wherein $R^3$ is —$(-CH_2-)_h$—; $R^4$ is —$(-CH_2-)_i$—$CH_3$; $R^5$ is —OH, —COOH —CH=$CH_2$, —C($CH_3$)=$CH_2$ or —$(-CH_2-)_j$—$CH_3$; $R^6$ is —$(-CH_2-)_k$—$CH_3$; g and h are an integer of 1 to 15; i, j and k are an integer of 0 to 15; e is an integer of 1 to 50; and f is an integer of 1 to 300;

(b) polysiloxanes modified with polyesters represented by the formula (IV):

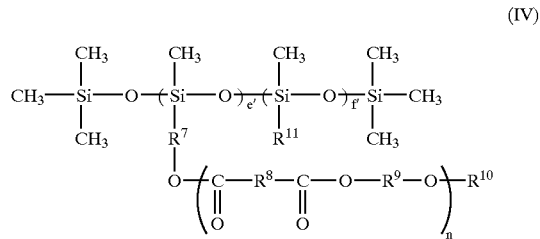

wherein $R^7$, $R^8$ and $R^9$ are —$(-CH_2-)_q$— and may be the same or different; $R^{10}$ is —OH, —COOH, —CH=$CH_2$, —C($CH_3$)=$CH_2$ or —$(-CH_2-)_r$—$CH_3$; $R^{11}$ is —$(-CH_2-)_s$—$CH_3$; n and q are an integer of 1 to 15; r and s are an integer of 0 to 15; e' is an integer of 1 to 50; and f' is an integer of 1 to 300;

(c) polysiloxanes modified with epoxy compounds represented by the formula (V):

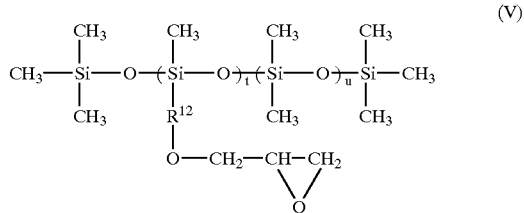

wherein $R^{12}$ is —$(-CH_2-)_v$—; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black, the polysiloxanes modified with the polyethers represented by the formula (III), are preferred.

As the terminal-modified polysiloxanes (2-B), there may be used those represented by the formula (VI):

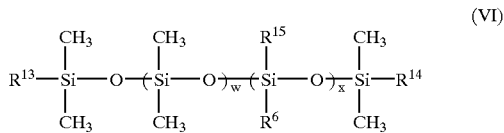

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —$(-CH_2-)_y$—; y is an integer of 1 to 15; w is an integer of 1 to 200; and x is an integer of 0 to 100.

Among these terminal-modified polysiloxanes, in view of the desorption percentage and the adhering effect of carbon black, the polysiloxanes whose terminals are modified with carboxylic acid groups are preferred.

The coating amount of the organosilicon compounds is usually 0.02 to 5.0% by weight, preferably 0.03 to 4.0% by weight, more preferably 0.05 to 3.0% by weight (calculated as Si) based on the weight of the magnetic acicular particles coated with the organosilicon compounds.

When the coating amount of the organosilicon compounds is less than 0.02% by weight, it becomes difficult to coat the carbon black on the surfaces of the magnetic acicular particles.

On the other hand, when the coating amount of the organosilicon compounds is more than 5.0% by weight, a sufficient amount of the carbon black coat can be formed on the surfaces of the coating layer.

The carbon black coat constituted by a single carbon black coat is formed on at least a part of the surface of coating layer composed of the organosilicon compounds.

The amount of the single carbon black coat formed on the coating layer composed of the organosilicon compounds is usually from more than 10 part by weight to 40 parts by weight.

When the amount of the carbon black coat formed is not more than 10 part by weight, it is difficult to reduce the myristic acid-adsorption to not more than 0.3 mg/m².

When the total amount of carbon black coat formed is more than 40 parts by weight, the myristic acid-adsorption of the obtained composite particles is as low as less than 0.01 mg/m².

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA100, MA7, #1000, #2400B, #30, MA77, MA8, #650, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN INTERNATIONAL CO., LTD.), BLACK PEARLS-L, BLACK PEARLS 1000, BLACK PEARLS 4630, VULCAN XC72, REGAL 660, REGAL 400, etc. (tradename, produced by CABOTT SPECIALTY CHEMICALS INK CO., LTD.), or the like.

In the consideration of the reducing effect of the myristic acid-adsorption, the carbon black fine particles having a pH value of not more than 9.0 is preferred. Especially, there may be exemplified #3050, #3150, #3250, #3750, #3950, MA100, MA7, #1000, #2400B, #30, MA77, MA8, #650, MA11, #50, #52, #45, #2200B, MA600 (tradename, produced by MITSUBISHI CHEMICAL CORP.), SEAST 9H, SEAST 7H, SEAST 6, SEAST 3H, SEAST 300, SEAST FM (tradename, produced by TOKAI CARBON CO., LTD.), Raven 1250, Raven 860, Raven 1000, Raven 1190 ULTRA (tradename, produced by COLOMBIAN CHEMICALS COMPANY), BLACK PEARLS-L, BLACK PEARLS 1000, BLACK PEARLS 4630, REGAL 660, REGAL 400 (tradename, produced by CABOT SPECIALTY CHEMICALS INK CO., LTD.).

Further, in the consideration of more uniform coat of carbon black to the coating layer comprising at least one organosilicon compound, the carbon black fine particles having a DBP oil absorption of not more than 180 ml/100 g is preferred. Especially, there may be exemplified #3050, #3150, #3250, MA100, MA7, #1000, #2400B, #30, MA77, MA8, #650, MA11, #50, #52, #45, #2200B, MA600 (tradename, produced by MITSUBISHI CHEMICAL CORP.), SEAST 9H, SEAST 7H, SEAST 6, SEAST 3H, SEAST 300, SEAST FM (tradename, produced by TOKAI CARBON CO., LTD.), Raven 1250, Raven 860, Raven 1000, Raven 1190 ULTRA (tradename, produced by COLOMBIAN CHEMICALS COMPANY), BLACK PEARLS-L, BLACK PEARLS 1000, BLACK PEARLS 4630, REGAL 660, REGAL 400 (tradename, produced by CABOT SPECIALTY CHEMICALS INK CO., LTD.).

The thickness of carbon black coat is usually not more than 0.06 μm, preferably not more than 0.04 μm, more preferably not more than 0.03 μm, still more preferably not more than 0.02 μm.

The particle shape and size of the black magnetic acicular composite particles according to the present invention, are considerably varied depending upon those of the core particles. More specifically, the particle shape or configuration of the magnetic acicular composite particles is similar to that of the core particles, and the particle size of the magnetic acicular composite particles is slightly larger than that of the core particles.

That is, the black magnetic acicular composite particles according to the present invention, have an average major axial diameter of usually 0.051 to 0.35 μm, preferably 0.051 to 0.34 μm, more preferably 0.051 to 0.33 μm; and an aspect ratio of usually 2.0:1 to 20.0:1, preferably 2.5:1 to 18.0:1, more preferably 3.0:1 to 15.0:1.

When the average major axial diameter is more than 0.35 μm, the obtained black magnetic acicular composite particles become too large. In the case where such large particles are used, the obtained magnetic recording layer may tend to be deteriorated in surface smoothness of coating film. When the average major axial diameter is less than 0.051 μm, the intermolecular force between the particles may become too large due to fineness thereof, so that the obtained composite particles may tend to be agglomerated together, resulting in deteriorated dispersibility in vehicle upon the production of a magnetic coating composition.

When the aspect ratio is more than 20.0:1, the particles may tend to be entangled or interlaced with each other, sometimes resulting in deteriorated dispersibility in vehicle upon the production of a magnetic coating composition and increased viscosity of the magnetic coating composition. When the aspect ratio is less than 2.0:1, the strength of coating film of the obtained magnetic recording medium using such particles may become small.

The geometrical standard deviation value of major axial diameters of the black magnetic acicular composite particles according to the present invention is usually not more than 2.0. When the geometrical standard deviation value is more than 2.0, coarse particles may be present in the obtained magnetic acicular composite particles, thereby adversely affecting the surface smoothness of the obtained coating film. In the consideration of the surface smoothness of coating film, the geometrical standard deviation value is preferably not more than 1.8, more preferably not more than 1.6. In the consideration of industrial productivity, the geometrical standard deviation value is not less than 1.01. Meanwhile, the particles having a geometrical standard deviation value of less than 1.01 are difficult to industrially produce.

The black magnetic acicular composite particles have a myristic acid absorption of usually 0.01 to 0.3 mg/m$^2$, preferably 0.01 to 0.29 mg/m$^2$, more preferably 0.01 to 0.28 mg/m$^2$.

When the myristic acid-adsorption of the black magnetic acicular composite particles is within the above-specified range, the amount of myristic acid absorbed thereinto is adequate, so that the amount of myristic acid oozed onto the surface of the magnetic recording layer can be readily controlled to an appropriate level. As a result, upon the repeated use of magnetic tape, it is possible to maintain a sufficiently low friction coefficient of the magnetic tape for a long period of time, thereby ensuring an excellent running property thereof.

The black magnetic acicular composite particles according to the present invention have a BET specific surface area of preferably 21 to 160 m$^2$/g, more preferably 26 to 130 m$^2$/g, still more preferably 29 to 110 m$^2$/g. When the BET specific surface area is less than 21 m$^2$/g, the obtained black magnetic acicular composite particles may tend to become coarse or be sintered together. In the case where such particles are used to produce a magnetic recording layer, the obtained coating film may tend to be deteriorated in surface smoothness. When the BET specific surface area is more than 160 m$^2$/g, the intermolecular force between the particles may be increased due to fineness thereof. As a result, the obtained particles may tend to be agglomerated together, resulting in deteriorated dispersibility in vehicle upon the production of magnetic coating composition.

As to the blackness of the black magnetic acicular composite particles having 0.5 to 10 parts by weight of the carbon black coat, the L* value thereof is usually not more than 23, preferably not more than 22, more preferably not more than 21. When the L* value is more than 23, the lightness of the particles becomes too high, thereby failing to obtain particles having a sufficient blackness. The L* value of the black magnetic acicular composite particles thereof is not less than 15.

As to the blackness of the black magnetic acicular particles, the L* value thereof is preferably not more than 22, more preferably not more than 21, still more preferably not more than 20. When the L* value is more than 22, the lightness of the particles becomes too high, thereby failing to obtain particles having a sufficient blackness. The L* value of the black magnetic acicular particles thereof is not less than 15.

The black magnetic acicular particles have a volume resistivity value of preferably not more than 1.0×10$^6$ Ω·cm, more preferably 1.0×10$^3$ to 5.0×10$^5$ Ω·cm, still more preferably 1.0×10$^3$ to 1.0×10$^5$ Ω·cm. When the volume resistivity value is more than 1.0×10$^6$ Ω·cm, it is difficult to sufficiently reduce the surface electrical resistivity value of the obtained magnetic recording medium.

The carbon black desorption percentage of the black magnetic acicular composite particles is preferably not more than 20%, more preferably not more than 10%. When the carbon black desorption percentage is more than 20%, the obtained particles may tend to be inhibited from uniformly dispersed in vehicle due to desorbed and liberated carbon black upon the production of magnetic recording media.

As to magnetic properties of the black magnetic acicular composite particles according to the present invention, the coercive force value thereof is usually 500 to 3500 Oe (39.8 to 278.5 kA/m), the saturation magnetization value is usually 60 to 170 emu/g (60 to 170 Am$^2$/kg).

In the case where the magnetic acicular cobalt-coated iron oxide particles are used as the core particles, the coercive force value thereof is preferably 500 to 1,700 Oe (39.8 to 135.3 kA/m), more preferably 550 to 1,700 Oe (43.8 to 135.3 kA/m); and the saturation magnetization value thereof is preferably 60 to 90 emu/g (60 to 90 Am$^2$/kg), more preferably 65 to 90 emu/g (65 to 90 Am$^2$/kg).

In the case where the magnetic acicular metal particles containing iron as a main component are used as the core particles, the coercive force value thereof is preferably 800 to 3,500 Oe (63.7 to 278.5 kA/m), more preferably 900 to 3,500 Oe (71.6 to 278.5 kA/m); and the saturation magnetization value thereof is preferably 90 to 170 emu/g (90 to 170 Am$^2$/kg), more preferably 100 to 170 emu/g (100 to 170 Am$^2$/kg).

At least a part of the surface of the magnetic acicular particle as a core particle used in the present invention may be coated with at least one selected from the group consisting of a hydroxide of aluminum, an oxide of aluminum, a hydroxide of silicon and an oxide of silicon (hereinafter referred to as "hydroxides and/or oxides of aluminum and/or silicon"). When the black magnetic acicular composite particles obtained by using as core particles the magnetic acicular particles which are coated with the hydroxides and/or oxides of aluminum and/or silicon, are dispersed in a vehicle, since it is possible to more effectively reduce the carbon black desorption percentage, it is more easy to obtain a desired dispersibility.

The amount of the hydroxides and/or oxides of aluminum and/or silicon coat is usually not more than 20% by weight, preferably 0.01 to 20% by weight (calculated as Al and/or SiO$_2$) based on the total weight of the magnetic acicular particles coated. If it is less than 0.01% by weight (calculated as Al and/or SiO$_2$) based on the total weight of the magnetic acicular particles coated, the dispersibility-improving effect by coating therewith may be insufficient.

When the coating amount of the hydroxide of aluminum or the like is more than 20% by weight, although there can be obtained a sufficient effect of reducing the percentage of carbon black desorbed or fallen-off from the surfaces of the core particles, the effect is already saturated and, therefore, the use of such a large coating amount of the hydroxide of aluminum or the like is unnecessary and meaningless.

From the point of view of dispersibility in the vehicle and industrial productivity, the more preferable amount of coating composition is 0.05 to 10% by weight (calculated as Al and/or $SiO_2$) based on the total weight of the magnetic acicular particles coated.

The particle size, geometrical standard deviation value, BET specific surface area, blackness L* value, volume resistivity and magnetic properties of the black magnetic acicular composite particles wherein the surface of the core particle is coated with the hydroxides and/or oxides of aluminum and/or silicon according to the present invention, are substantially the same as those of the black magnetic acicular composite particles wherein the core particle is uncoated with the hydroxides and/or oxides of aluminum and/or silicon according to the present invention.

In addition, the desorption percentage of carbon black of the black magnetic acicular composite particles wherein the surface of the core particle is coated with the hydroxides and/or oxides of aluminum and/or silicon is more improved as compared with that of the black magnetic acicular composite particles wherein the core particle is uncoated therewith. The carbon black desorption percentage of the black magnetic acicular composite particles wherein the surface of the core particle is coated with the hydroxides and/or oxides of aluminum and/or silicon, is preferably not more than 10%, more preferably not more than 5%.

Next, the magnetic recording medium of the first and second aspect in the present invention is described.

The magnetic recording medium according to the present invention comprises:

a non-magnetic base film; and a magnetic recording layer formed on the non-magnetic base film, comprising a binder resin and the black magnetic acicular composite particles.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 μm, preferably 2.0 to 200 μm.

In the case of a magnetic disc, polyethylene terephthalate is usually used as the non-magnetic base film, and the thickness thereof is usually 50 to 300 μm, preferably 60 to 200 μm.

In a magnetic tape, when polyethylene terephthalate is used as the non-magnetic base film, the thickness thereof is usually 3 to 100 μm, preferably 4 to 20 μm; when polyethylene naphthalate is used, the thickness thereof is usually 3 to 50 μm, preferably 4 to 20 μm; and when polyamide is used, the thickness thereof is usually 2 to 10 μm, preferably 3 to 7 μm.

As the binder resin used in the present invention, the following resins which are at present generally used for the production of a magnetic recording medium are usable: vinyl chloride-vinyl acetate copolymer, polyurethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof.

Each of these resin binders may contain a functional group such as —OH, —COOH, —$SO_3M$, —$OPO_2M_2$ and —$NH_2$, wherein M represents H, Na or K. With the consideration of the dispersibility of the black magnetic acicular composite particles, a binder resin containing a functional group —COOH or —$SO_3M$ is preferable.

The thickness of the magnetic recording layer obtained by applying the magnetic coating composition on the surface of the non-magnetic base film and dried, is usually in the range of 0.01 to 5.0 μm. If the thickness is less than 0.01 μm, uniform coating may be difficult, so that unfavorable phenomenon such as unevenness on the coating surface is observed. On the other hand, when the thickness exceeds 5.0 μm, it may be difficult to obtain desired signal recording property due to an influence of diamagnetism. The preferable thickness is in the range of 0.1 to 4.0 μm.

The mixing ratio of the black magnetic acicular composite particles with the binder resin is usually 5 to 2000 parts by weight, preferably 100 to 1000 parts by weight based on 100 parts by weight of the binder resin.

When the amount of the black magnetic acicular composite particles blended is less than 5 parts by weight, the obtained magnetic coating composition contains a too small amount of the black magnetic acicular composite particles. As a result, when a coating film is produced from such a magnetic coating composition, it is not possible to obtain a coating film in which the black magnetic acicular composite particles are continuously dispersed, so that the surface smoothness and the strength of the coating film become unsatisfactory. On the other hand, when the amount of the black magnetic acicular composite particles blended is more than 2,000 parts by weight, the amount of the black magnetic acicular composite particles becomes too large relative to that of the binder resin, so that it is not possible to sufficiently disperse the black magnetic acicular composite particles in the magnetic coating composition. As a result, when a coating film is produced from such a magnetic coating composition, it is difficult to obtain a coating film having a sufficiently smooth surface. Further, since the black magnetic acicular composite particles cannot be sufficiently bound with each other by the binder resin, the obtained coating film tends to become brittle.

In the magnetic recording medium according to the present invention, the amount of carbon black fine particles added to the magnetic recording layer thereof can be reduced to usually less than 6 parts by weight, preferably less than 5 parts by weight, more preferably less than 3 parts by weight based on 100 parts by weight of the black magnetic acicular composite particles.

Further, in the case where the black magnetic acicular composite particles wherein a large amount of the carbon black can be coated onto the surface thereof, are used as magnetic particles, it can be expected to omit the addition of the carbon black fine particles to the magnetic recording layer.

Incidentally, the magnetic recording layer may optionally contain a lubricant, an abrasive, an anti-static agent and other additives which are usually used for the production of magnetic recording media, in an amount of 0.1 to 50 parts by weight based on 100 parts of the binder resin.

The magnetic recording medium of the third and fourth aspects in the present invention, comprises a non-magnetic base film, a non-magnetic undercoat layer formed on the non-magnetic base film comprising a binder resin and non-magnetic particles, and a magnetic recording layer formed on the non-magnetic undercoat layer, comprising a binder resin and black magnetic acicular composite particles.

The thickness of the non-magnetic undercoat layer is preferably 0.2 to 10.0 μm. When the thickness of the non-magnetic undercoat layer is less than 0.2 μm, it may be difficult to improve the surface roughness of the non-magnetic substrate, and the stiffness of a coating film formed thereon tends to be unsatisfactory. In the consideration of reduction in total thickness of the magnetic recording medium as well as the stiffness of the coating film, the thickness of the non-magnetic undercoat layer is more preferably in the range of 0.5 to 5.0 μm.

As the binder resin, the same binder resin as that used for the production of the magnetic recording layer is usable.

The mixing ratio of the non-magnetic particles to the binder resin is usually 5 to 2000 parts by weight, preferably 100 to 1000 parts by weight based on 100 parts by weight of the binder resin.

When the content of the non-magnetic particles is as small as less than 5 parts by weight, such a non-magnetic undercoat layer in which the non-magnetic particles are uniformly and continuously dispersed may not be obtained upon coating, resulting in insufficient surface smoothness and insufficient stiffness of the non-magnetic substrate. When the content of the non-magnetic particles is more than 2,000 parts by weight, the non-magnetic particles may not be sufficiently dispersed in a non-magnetic coating composition since the amount of the non-magnetic particles is too large as compared to that of the binder resin. As a result, when such a non-magnetic coating composition is coated onto the non-magnetic base film, it may become difficult to obtain a coating film having a sufficiently smooth surface. Further, since the non-magnetic particles may not be sufficiently bonded together through the binder resin, the obtained coating film tends to become brittle.

It is possible to add an additive such as a lubricant, a polishing agent, an antistatic agent, etc. which are generally used for the production of a magnetic recording medium, to the non-magnetic undercoating layer. The mixing ratio of the additive to the binder resin is preferably 0.1 to 50 parts by weight based on 100 parts by weight of the binder resin.

As the non-magnetic particles used in the non-magnetic undercoat layer of the present invention, there may be exemplified non-magnetic inorganic particles ordinarily used for forming a non-magnetic undercoat layer in conventional magnetic recording media. Specific examples of the non-magnetic particles may include hematite particles, iron oxide hydroxide particles, titanium oxide particles, zinc oxide particles, tin oxide particles, tungsten oxide particles, silicon dioxide particles, α-alumina particles, β-alumina particles, γ-alumina particles, chromium oxide particles, cerium oxide particles, silicon carbide particles, titanium carbide particles, silicon nitride particles, boron nitride particles, calcium carbonate particles, barium carbonate particles, magnesium carbonate particles, strontium carbonate particles, calcium sulfate particles, barium sulfate particles, molybdenum disulfide particles, barium titanate particles or the like. These non-magnetic particles may be used singly or in the form of a mixture of any two or more thereof. Among them, the use of hematite particles, iron oxide hydroxide particles, titanium oxide particles and the like is preferred.

In the present invention, in order to improve the dispersibility of the non-magnetic particles in vehicle upon the production of non-magnetic coating composition, the non-magnetic particles may be surface-treated with hydroxides of aluminum, oxides of aluminum, hydroxides of silicon, oxides of silicon or the like to form a coat made of any of these compounds on the surfaces thereof. Further, the non-magnetic particles may contain Al, Ti, Zr, Mn, Sn, Sb or the like inside thereof, if required, in order to improve various properties of the obtained magnetic recording media such as light transmittance, surface electrical resistivity, mechanical strength, surface smoothness, durability or the like.

The particle shape of the hematite particles as the core particles may include a granular shape such as a spherical shape, an irregular (anisotropic) shape, an octahedral shape, a hexahedral shape, a polyhedral shape or the like; an acicular shape such as a needle shape, a spindle shape, a rice ball shape or the like; and a plate shape, or the like.

The lower limit of the average particle size of the hematite particles as the core particles is usually 0.075 μm, preferably 0.085 μm, more preferably 0.095 μm, and the upper limit thereof is usually 0.95 μm, preferably 0.65 μm, more preferably 0.45 μm.

(i) In the case where the shape of the core particles is granular-shaped, the lower limit of the average particle diameter of the granular-shaped hematite particles is usually 0.075 μm, preferably 0.085 μm, more preferably 0.095 μm, and the upper limit thereof is usually 0.95 μm, preferably 0.65 μm, more preferably 0.45 μm.

(ii) In the case where the shape of the core particles is acicular-shaped, the lower limit of the average particle diameter (average major axis diameter) of the acicular-shaped hematite particles is usually 0.075 μm, preferably 0.085 μm, more preferably 0.095 μm, and the upper limit thereof is usually 0.95 μm, preferably 0.65 μm, more preferably 0.45 μm; and the lower limit of the aspect ratio (average major axis diameter/average minor axis diameter) of the acicular-shaped hematite particles is usually 2:1, preferably 2.5:1, more preferably 3:1, and the upper limit thereof is usually 20:1, preferably 15:1, more preferably 10:1.

(iii) In the case where the shape of the core particles is plate-shaped, the lower limit of the average particle diameter (average plate surface diameter) of the plate-shaped hematite particles is usually 0.075 μm, preferably 0.085 μm, more preferably 0.095 μm, and the upper limit thereof is usually 0.95 μm, preferably 0.65 μm, more preferably 0.45 μm; and the lower limit of the plate ratio (average plate surface diameter/average thickness) of the plate-shaped hematite particles is usually 2:1, preferably 2.5:1, more preferably 3:1, and the upper limit thereof is usually 50:1, preferably 45:1, more preferably 40:1.

The magnetic recording medium according to the present invention has a coercive force of usually 500 to 3500 Oe (39.8 to 278.5 kA/m); a squareness (residual magnetic flux density Br/saturation magnetic flux density Bm) of usually 0.85 to 0.95; a gloss (of the coating film) of usually 165 to 300%; a surface roughness Ra (of the coating film) of usually not more than 11.5 nm; a Young's modulus (relative value to a commercially available video tape: AV T-120 produced by Victor Company of Japan, Limited) of usually 124 to 160; a linear adsorption coefficient (of the coating film) of usually 1.75 to 10.00 $\mu m^{-1}$; a surface electrical resistivity of usually not more than $1.0 \times 10^8$ $\Omega/cm^2$; a running durability time thereof of usually not less than 24 minutes.

The properties of the magnetic recording media of the first and second aspects are generally comprise: a non-magnetic base film and a magnetic recording layer formed on the non-magnetic base film.

In case of using the black magnetic acicular composite particles, wherein the magnetic acicular cobalt-coated iron oxide particles are used as core particles, which are coated with no hydroxides and/or oxides of aluminum and/or silicon, the magnetic recording medium of the first aspect in the present invention has a coercive force of usually 500 to 1,700 Oe (39.8 to 135.3 kA/m), preferably 550 to 1,700 Oe (43.8 to 135.3 kA/m); a squareness (residual magnetic flux density Br/saturation magnetic flux density Bm) of usually 0.85 to 0.95, preferably 0.86 to 0.95; a gloss (of the coating film) of usually 165 to 300%, preferably 170 to 300%; a surface roughness Ra (of the coating film) of usually not more than 11.5 nm, preferably 2.0 to 10.5 nm, more preferably 2.0 to 9.5 nm, a Young's modulus (relative value to a commercially available video tape: AV T-120 produced by Victor Company of Japan, Limited) of usually 124 to 160, preferably 125 to 160; a linear adsorption coefficient (of the coating film) of usually 1.75 to 10.0 $\mu m^{-1}$, preferably 1.80 to 10.0 $\mu m^{-1}$; and a surface electrical resistivity of usually not more than $1.0 \times 10^8$ $\Omega/cm^2$, preferably not more than $7.5 \times 10^7$ $\Omega/cm^2$, more preferably not more than $5.0 \times 10^7$ $\Omega/cm^2$; a running durability time thereof of usually not less than 24 minutes, preferably not less than 25 minutes; a friction coefficient of usually 0.25 to 0.30, preferably 0.25 to 0.29.

In case of using the black magnetic acicular composite particles, wherein the magnetic acicular metal particles containing iron as a main component are used as core particles which are coated with no hydroxides and/or oxides of aluminum and/or silicon, the magnetic recording medium of the first aspect in the present invention has a coercive force of usually 800 to 3,500 Oe (63.7 to 278.5 kA/m), preferably 900 to 3,500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 185 to 300%, preferably 195 to 300%; a surface roughness Ra (of the coating film) of usually not more than 11.5 nm, preferably 2.0 to 10.5 nm, more preferably 2.0 to 9.5 nm, a Young's modulus (relative value to a commercially available video tape: AV T-120 produced by Victor Company of Japan, Limited) of usually 124 to 160, preferably 125 to 160; a linear adsorption coefficient (of the coating film) of usually 1.85 to 10.0 $\mu m^{-1}$, preferably 1.90 to 10.0 $\mu m^{-1}$; and a surface electrical resistivity of usually not more than $1.0 \times 10^8$ $\Omega/cm^2$, preferably not more than $7.5 \times 10^7$ $\Omega/cm^2$, more preferably not more than $5.0 \times 10^7$ $\Omega/cm^2$; a running durability time thereof of usually not less than 24 minutes, preferably not less than 25 minutes; a friction coefficient of usually 0.25 to 0.30, preferably 0.25 to 0.29.

In case of using the black magnetic acicular composite particles, wherein the magnetic acicular cobalt-coated iron oxide particles as core particles which are coated with hydroxides and/or oxides of aluminum and/or silicon, the magnetic recording medium of the second aspect in the present invention has a coercive force of usually 500 to 1,700 Oe (39.8 to 135.3 kA/m), preferably 550 to 1,700 Oe (43.8 to 135.3 kA/m); a squareness (residual magnetic flux density Br/saturation magnetic flux density Bm) of usually 0.85 to 0.95, preferably 0.86 to 0.95; a gloss (of the coating film) of usually 170 to 300%, preferably 175 to 300%; a surface roughness Ra (of the coating film) of usually not more than 10.5 nm, preferably 2.0 to 9.5 nm, more preferably 2.0 to 8.5 nm, a Young's modulus (relative value to a commercially available video tape: AV T-120 produced by Victor Company of Japan, Limited) of usually 126 to 160, preferably 127 to 160; a linear adsorption coefficient (of the coating film) of usually 1.75 to 10.0 $\mu m^{-1}$, preferably 1.80 to 10.0 $\mu m^{-1}$; and a surface electrical resistivity of usually not more than $1.0 \times 10^8$ $\Omega/cm^2$, preferably not more than $7.5 \times 10^7$ $\Omega/cm^2$, more preferably not more than $5.0 \times 10^7$ $\Omega/cm^2$; a running durability time thereof of usually not less than 26 minutes, preferably not less than 27 minutes; a friction coefficient of usually 0.21 to 0.26, preferably 0.21 to 0.25.

In case of using the black magnetic acicular composite particles, wherein the magnetic acicular metal particles containing iron as a main component as core particles which are coated with hydroxides and/or oxides of aluminum and/or silicon, the magnetic recording medium the second aspect in the present invention has a coercive force of usually 800 to 3500 Oe (63.7 to 278.5 kA/m), preferably 900 to 3500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 190 to 300%, preferably 200 to 300%; a surface roughness Ra (of the coating film) of usually not more than 10.5 nm, preferably 2.0 to 9.5 nm, more preferably 2.0 to 8.5 nm, a Young's modulus (relative value to a commercially available video tape: AV T-120 produced by Victor Company of Japan, Limited) of usually 126 to 160, preferably 127 to 160; a linear adsorption coefficient (of the coating film) of usually 1.85 to 10.0 $\mu m^{-1}$, preferably 1.90 to 10.0 $\mu m^{-1}$; and a surface electrical resistivity of usually not more than $1.0 \times 10^8$ $\Omega/cm^2$, preferably not more than $7.5 \times 10^7$ $\Omega/cm^2$, more preferably not more than $5.0 \times 10^7$ $\Omega/cm^2$; a running durability time thereof of usually not less than 26 minutes, preferably not less than 27 minutes; a friction coefficient of usually 0.21 to 0.26, preferably 0.21 to 0.25.

The properties of the magnetic recording media of the third and fourth aspect are generally comprise: a non-magnetic base film, a non-magnetic undercoat layer formed on the non-magnetic base film, and a magnetic recording layer formed on the non-magnetic undercoat layer.

In case of using the black magnetic acicular composite particles, wherein the magnetic acicular cobalt-coated iron oxide particles which are coated with no hydroxides and/or oxides of aluminum and/or silicon, the magnetic recording medium the fifth aspect the present invention has a coercive force of usually 500 to 1,700 Oe (39.8 to 135.3 kA/m), preferably 550 to 1,700 Oe (43.8 to 135.3 kA/m); a squareness (residual magnetic flux density Br/saturation magnetic flux density Bm) of usually 0.85 to 0.95, preferably 0.86 to 0.95; a gloss (of the coating film) of usually 165 to 300%, preferably 170 to 300%; a surface roughness Ra (of the coating film) of usually not more than 11.0 nm, preferably 2.0 to 10.5 nm, more preferably 2.0 to 10.0 nm, a Young's modulus (relative value to a commercially available video tape: AV T-120 produced by Victor Company of Japan, Limited) of usually 125 to 160, preferably 126 to 160; a linear adsorption coefficient (of the coating film) of usually 1.40 to 10.0 $\mu m^{-1}$, preferably 1.45 to 10.0 $\mu m^{-1}$; and a surface electrical resistivity of usually not more than $1.0 \times 10^9$ $\Omega/cm^2$, preferably not more than $7.5 \times 10^8$ $\Omega/cm^2$, more preferably not more than $5.0 \times 10^8$ $\Omega/cm^2$; a running durability time thereof of usually not less than 25 minutes, preferably not less than 26 minutes.

In case of using the black magnetic acicular composite particles wherein the magnetic acicular cobalt-coated iron oxide particles which are coated with no hydroxides and/or oxides of aluminum and/or silicon, the magnetic recording medium of the third aspect not only can satisfy the above described properties, but also can exhibit a linear absorption (of coating film) of usually 1.80 to 10.00 $\mu m^{-1}$, preferably 1.85 to 10.00 $\mu m^{-1}$; a surface electrical resistivity value (of coating film) of usually not more than $1.0 \times 10^8$ $\Omega/cm^2$, preferably not more than $7.5 \times 10^7$ $\Omega/cm^2$, more preferably not more than $5.0 \times 10^7$ $\Omega/cm^2$; a friction coefficient of usually 0.25 to 0.30, preferably 0.25 to 0.29; and a running durability time thereof of usually not less than 26 minutes, preferably not less than 27 minutes.

In case of using the black magnetic acicular composite particles, wherein the magnetic acicular metal particles containing iron as a main component which are coated with no hydroxides and/or oxides of aluminum and/or silicon, the magnetic recording medium the fifth aspect in the present invention has a coercive force of usually 800 to 3,500 Oe (63.7 to 278.5 kA/m), preferably 900 to 3,500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 185 to 300%, preferably 195 to 300%; a surface roughness Ra (of the coating film) of usually not more than 11.0 nm, preferably 2.0 to 10.5 nm, more preferably 2.0 to 10.0 nm, a Young's modulus (relative value to a commercially available video tape: AV T-120 produced by Victor Company of Japan, Limited) of usually 125 to 160, preferably 126 to 160; a linear adsorption coefficient (of the coating film) of usually 1.40 to 10.0 $\mu m^{-1}$, preferably 1.45 to 10.0 $\mu m^{-1}$; and a surface electrical resistivity of usually not more than $1.0 \times 10^9$ $\Omega/cm^2$, preferably not more than $7.5 \times 10^8$ $\Omega/cm^2$, more preferably not more than $5.0 \times 10^8$ $\Omega/cm^2$; a running durability time thereof of usually not less than 25 minutes, preferably not less than 26 minutes.

In case of using the black magnetic acicular composite particles, wherein the magnetic acicular metal particles containing iron as a main component which are coated with hydroxides and/or oxides of aluminum and/or silicon, the magnetic recording medium of the third aspect not only can satisfy the above described properties, but also can exhibit a linear absorption (of coating film) of usually 1.80 to 10.00 $\mu m^{-1}$, preferably 1.85 to 10.00 $\mu m^{-1}$; a surface electrical resistivity value (of coating film) of usually not more than $1.0 \times 10^8$ $\Omega/cm^2$, preferably not more than $7.5 \times 10^7$ $\Omega/cm^2$, more preferably not more than $5.0 \times 10^7$ $\Omega/cm^2$; a friction coefficient of usually 0.25 to 0.30, preferably 0.25 to 0.29; and a running durability time thereof of usually not less than 26 minutes, preferably not less than 27 minutes.

In case of using the black magnetic acicular composite particles, wherein the magnetic acicular cobalt-coated iron oxide particles which are coated with hydroxides and/or oxides of aluminum and/or silicon, the magnetic recording medium of the sixth aspect in the present invention has a coercive force of usually 500 to 1,700 Oe (39.8 to 135.3 kA/m), preferably 550 to 1,700 Oe (43.8 to 135.3 kA/m); a squareness (residual magnetic flux density Br/saturation magnetic flux density Bm) of usually 0.85 to 0.95, preferably 0.86 to 0.95; a gloss (of the coating film) of usually 170 to 300%, preferably 175 to 300%; a surface roughness Ra (of the coating film) of usually not more than 10.0 nm, preferably 2.0 to 9.5 nm, more preferably 2.0 to 9.0 nm, a Young's modulus (relative value to a commercially available video tape: AV T-120 produced by Victor Company of Japan, Limited) of usually 127 to 160, preferably 128 to 160; a linear adsorption coefficient (of the coating film) of usually 1.45 to 10.0 $\mu m^-$, preferably 1.50 to 10.0 $\mu m^{-1}$; and a surface electrical resistivity of usually not more than $1.0 \times 10^9$ $\Omega/cm^2$, preferably not more than $7.5 \times 10^8$ $\Omega/cm^2$, more preferably not more than $5.0 \times 10^8$ $\Omega/cm^2$; a running durability time thereof of usually not less than 26 minutes, preferably not less than 27 minutes.

In case of using the black magnetic acicular composite particles, wherein the magnetic acicular cobalt-coated iron oxide particles which are coated with hydroxides and/or oxides of aluminum and/or silicon, the magnetic recording medium of the fourth aspect not only can satisfy the above described properties, but also can exhibit a linear absorption (of coating film) of usually 1.85 to 10.00 $\mu m^{-1}$, preferably 1.90 to 10.00 $\mu m^{-1}$; a surface electrical resistivity value (of coating film) of usually not more than $5.0 \times 10^7$ $\Omega/cm^2$, preferably not more than $2.5 \times 10^7$ $\Omega/cm^2$, more preferably not more than $1.0 \times 10^7$ $\Omega/cm^2$; a friction coefficient of usually 0.21 to 0.26, preferably 0.21 to 0.25; and a running durability time thereof of usually not less than 27 minutes, preferably not less than 28 minutes.

In case of using the black magnetic acicular composite particles, wherein the magnetic acicular metal particles containing iron as a main component which are coated with hydroxides and/or oxides of aluminum and/or silicon, the magnetic recording medium the sixth aspect in the present invention has a coercive force of usually 800 to 3,500 Oe (63.7 to 278.5 kA/m), preferably 900 to 3,500 Oe (71.6 to 278.5 kA/m); a squareness (residual magnetic flux density Br/saturation magnetic flux density Bm) of usually 0.85 to 0.95, preferably 0.86 to 0.95; a gloss (of the coating film) of usually 190 to 300%, preferably 200 to 300%; a surface roughness Ra (of the coating film) of usually not more than 10.0 nm, preferably 2.0 to 9.5 nm, more preferably 2.0 to 9.0 nm, a Young's modulus (relative value to a commercially available video tape: AV T-120 produced by Victor Company of Japan, Limited) of usually 127 to 160, preferably 128 to 160; a linear adsorption coefficient (of the coating film) of usually 1.45 to 10.0 $\mu m^{-1}$, preferably 1.50 to 10.0 $\mu m^{-1}$; and a surface electrical resistivity of usually not more than $1.0 \times 10^9$ $\Omega/cm^2$, preferably not more than $7.5 \times 10^8$ $\Omega/cm^2$, more preferably not more than $5.0 \times 10^8$ $\Omega/cm^2$; a running durability time thereof of usually not less than 26 minutes, preferably not less than 27 minutes.

In case of using the black magnetic acicular composite particles, wherein the magnetic acicular metal particles containing iron as a main component which are coated with hydroxides and/or oxides of aluminum and/or silicon, the magnetic recording medium of the fourth aspect not only can satisfy the above described properties, but also can exhibit a linear absorption (of coating film) of usually 1.85 to 10.00 $\mu m^{-1}$, preferably 1.90 to 10.00 $\mu m^{-1}$; a surface electrical resistivity value (of coating film) of usually not more than $5.0 \times 10^7$ $\Omega/cm^2$, preferably not more than $2.5 \times 10^7$ $\Omega/cm^2$, more preferably not more than $1.0 \times 10^7$ $\Omega/cm^2$; a friction coefficient of usually 0.21 to 0.26, preferably 0.21 to 0.25; and a running durability time thereof of usually not less than 27 minutes, preferably not less than 28 minutes.

The black magnetic acicular composite particles according to the present invention can be produced by the following method.

As the core particles used in the present invention, known Co-coated magnetic acicular iron oxide particles and magnetic acicular metal particles containing iron as a main component may be used.

The coating of the magnetic acicular particles with the alkoxysilane compounds, the polysiloxanes, the modified polysiloxanes, or the terminal-modified polysiloxanes, may be conducted (i) by mechanically mixing and stirring the magnetic acicular particles together with the alkoxysilane compounds, the polysiloxanes, the modified polysiloxanes, or the terminal-modified polysiloxanes; or (ii) by mechanically mixing and stirring both the components together while spraying the alkoxysilane compounds, the polysiloxanes, the modified polysiloxanes, or the terminal-modified polysiloxanes onto the magnetic acicular particles.

In these cases, substantially whole amount of the alkoxysilane compounds, the polysiloxanes, the modified polysiloxanes, or the terminal-modified polysiloxanes added can be applied onto the surfaces of the magnetic acicular particles.

In addition, by conducting the above-mentioned mixing or stirring treatment (i) of the hematite particles as core particles together with the alkoxysilane compounds, at least a part of the alkoxysilane compounds coated on the hematite particles as core particles may be changed to the organosilane compounds. In this case, there is also no affection against the formation of the carbon black coat thereon.

In order to uniformly coat the surfaces of the magnetic acicular particles with the alkoxysilane compounds, the polysiloxanes, the modified polysiloxanes, or the terminal-modified polysiloxanes, it is preferred that the magnetic acicular particles are preliminarily diaggregated by using a pulverizer.

As apparatus (a) for mixing and stirring treatment (i) of the core particles with the alkoxysilane compounds, the polysiloxanes, the modified polysiloxanes, or the terminal-modified polysiloxanes to form the coating layer thereof, and as apparatus (b) for mixing and stirring treatment (ii) of carbon black fine particles with the particles whose surfaces are coated with the alkoxysilane compounds, the polysiloxanes, the modified polysiloxanes, or the terminal-modified polysiloxanes to form the carbon black coat, there may be preferably used those apparatus capable of applying a shear force to the particles, more preferably those apparatuses capable of conducting the application of shear force, spaturate force and compressed force at the same time. In addition, by conducting the above mixing or stirring treatment (a) of the core particles together with the alkoxysilane compounds, the polysiloxanes, the modified polysiloxanes, or the terminal-modified polysiloxanes, at least a part of the alkoxysilane compounds coated on the core particles may be changed to the organosilane compounds.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, or the terminal-modified polysiloxanes as uniformly as possible, the conditions of the above mixing or stirring treatment may be appropriately controlled such that the linear load is usually 2 to 200 Kg/cm (19.6 to 1960 N/cm), preferably 10 to 150 Kg/cm (98 to 1470 N/cm), more preferably 15 to 100 Kg/cm (147 to 980 N/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, or the terminal-modified polysiloxanes added, is preferably 0.15 to 45 parts by weight based on 100 parts by weight of the magnetic acicular particles.

Next, the carbon black fine particles are added to the magnetic acicular particles coated with the alkoxysilane compounds, the polysiloxanes, the modified polysiloxanes or the terminal-modified polysiloxanes, and the resultant mixture is mixed and stirred to form a carbon black coat (single carbon black coat) on the surfaces of the coating layer composed of the alkoxysilane compounds, the polysiloxanes, the modified polysiloxanes or the terminal-modified polysiloxanes.

It is preferred that the carbon black fine particles are added little by little and slowly, especially, preferably 5 minutes to 24 hours, more preferably 5 minutes to 20 hours.

In order to form a single carbon black coat (carbon black-coating monolayer) onto the coating layer composed of the alkoxysilane compounds, the polysiloxanes, the modified polysiloxanes, or the terminal-modified polysiloxanes as uniformly as possible, the conditions of the above mixing or stirring treatment can be appropriately controlled such that the linear load is usually 2 to 200 Kg/cm (19.6 to 1960 N/cm), preferably 10 to 150 Kg/cm (98 to 1470 N/cm), more preferably 15 to 100 Kg/cm (147 to 980 N/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of carbon black fine particles added is from more than 10 parts by weight to 40 parts by weight based on 100 parts by weight of the core particles. When the amount of carbon black fine particles added is not more than 10 part by weight, the amount of carbon black coat may become too small. As a result, it may be difficult to obtain black magnetic acicular composite particles having an excellent blackness and a low volume resistivity value. When the amount of carbon black fine particles added is more than 40 parts by weight, the effect of improving the blackness and the volume resistivity value of the obtained black magnetic acicular composite particles is already saturated and, therefore, the addition of such a large amount of carbon black fine particles is unnecessary and meaningless.

In particular, in order to obtain black magnetic acicular composite particles having a carbon black coat, it is preferred to add carbon black in two or more separate parts while alternately repeating the addition and adhesion thereof.

In the present invention, after carbon black is adhered onto the core particles, the obtained black magnetic acicular composite particles may be dried or heat-treated. The temperature used in the drying or heat-treatment, is preferably 40 to 200° C., more preferably 60 to 150° C., and the heating time is preferably from 10 minutes to 12 hours, more preferably from 30 minutes to 3 hours. By conducting such drying or heat-treatment, the alkoxysilane can be converted into organosilane compounds.

The alkoxysilane used to coat the core particles in the thus obtained composite particles is finally converted into the organosilane compound through these steps.

It is preferred that the cobalt-coated magnetite particles, the magnetic acicular metal particles containing iron as a main component, the magnetic acicular iron alloy particles or the like, which are susceptible to oxidation, be placed within a mixing device and purged with an inert gas such as $N_2$ gas in order to prevent the deterioration in magnetic properties thereof by the oxidation.

At least a part of the surface of the magnetic acicular particles may be coated with at least one compound selected from the group consisting of hydroxides of aluminum, oxides of aluminum, hydroxides of silicon and oxides of silicon (hereinafter referred to as "hydroxides and/or oxides of aluminum and/or silicon"), if required, in advance of mixing and stirring with the alkoxysilane compounds, the polysiloxanes, the modified polysiloxanes, or the terminal-modified polysiloxanes.

The coating of the hydroxides and/or oxides of aluminum and/or silicon may be conducted by adding an aluminum compound, a silicon compound or both the compounds to a water suspension in which the magnetic acicular particles are dispersed, followed by mixing and stirring, and further adjusting the pH value of the suspension, if required, thereby coating the surfaces of the magnetic acicular particles with at least one compound selected from the group consisting of hydroxides of aluminum, oxides of aluminum, hydroxides of silicon and oxides of silicon. The thus obtained magnetic acicular particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate or the like.

The amount of the aluminum compound added is 0.01 to 20% by weight (calculated as Al) based on the weight of the magnetic acicular particles. When the amount of the aluminum compound added is less than 0.01% by weight, it may be difficult to sufficiently coat the surfaces of the magnetic acicular particles with hydroxides and/or oxides of aluminum, thereby failing to improve the effective reduction of the carbon black desorption percentage. On the other hand, when the amount of the aluminum compound added is more than 20% by weight, the coating effect is saturated and, therefore, it is meaningless to add such an excess amount of the aluminum compound.

As the silicon compounds, there may be exemplified #3 water glass, sodium orthosilicate, sodium metasilicate or the like.

The amount of the silicon compound added is 0.01 to 20% by weight (calculated as $SiO_2$) based on the weight of the magnetic acicular particles. When the amount of the silicon compound added is less than 0.01% by weight, it may be difficult to sufficiently coat the surfaces of the magnetic acicular particles with hydroxides and/or oxides of silicon, thereby failing to improve the effective reduction of the carbon black desorption percentage. On the other hand, when the amount of the silicon compound added is more than 20% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the magnetic acicular particles.

Next, the process for producing the magnetic recording medium according to the present invention is described.

The magnetic recording medium according to the first and second aspects of the present invention can be produced by an ordinary method, i.e., by coating the surface of the non-magnetic base film with a magnetic coating composition comprising black magnetic acicular composite particles, a binder resin, and a solvent to form a magnetic recording layer thereon, and then magnetically orienting the magnetic recording layer.

The magnetic recording medium according to the third to sixth aspects of the present invention can be produced by an ordinary method, i.e., by coating the surface of the non-magnetic base film with a non-magnetic coating composition comprising non-magnetic particles, a binder resin and a solvent to form a coating film thereon; drying the coating film to form a non-magnetic undercoat layer; coating the surface of the non-magnetic undercoat layer with a magnetic coating composition comprising black magnetic acicular composite particles, a binder resin and a solvent to form a magnetic recording layer thereon, and then magnetically orienting the magnetic recording layer.

Upon kneading and dispersing the non-magnetic coating composition and magnetic coating composition, as kneaders, there may be used, for example, twin-screw kneader, twin-screw extruder, pressure kneader, twin-roll mill, triple-roll mill or the like; and as dispersing devices, there may be used ball mill, sand grinder, attritor, disper, homogenizer, ultrasonic dispersing device or the like.

The coating of the non-magnetic coating composition and magnetic coating composition may be conducted using gravure coater, reverse-roll coater, slit coater, die coater or the like. The thus obtained coating film may be magnetically oriented using counter magnet, solenoid magnet or the like.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the black magnetic acicular composite particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

The one point of the present invention is the fact that when a single carbon black coat is firmly formed onto the surfaces of the core particles in an amount as large as from more than 10 to 40 parts by weight based on 100 parts by weight of the core particles, the obtained magnetic acicular composite particles can exhibit a well-controlled myristic acid-adsorption of 0.01 to 0.3 mg/m$^2$.

The reason why the magnetic acicular composite particles of the present invention can exhibit a reduced myristic acid-adsorption, is considered as follows, though not clearly known yet. That is, due to the fact that the myristic acid-adsorption of the magnetic acicular particles cannot be reduced to not more than 0.3 mg/m$^2$ in any of the cases where the carbon black desorption percentage is more than 20% even though the amount of carbon black adhered is more than 10 parts by weight, and where the amount of carbon black adhered is not more than 10 parts by weight even though the carbon black desorption percentage is not more than 20%, as described in Comparative Examples below, it is considered that many hydroxyl groups present on the surface of the core particles are prevented from being bonded with carboxyl groups of myristic acid which show a high affinity to the hydroxyl groups.

Also, the magnetic recording medium of the first and second aspect of the present invention using the above magnetic acicular particles according to the present invention can exhibit a low friction coefficient and an excellent running durability.

The reason why the magnetic recording medium of the first and second aspect of the present invention can show a reduced friction coefficient, is considered by the present inventors as follows. That is, since the amount of myristic acid adsorbed onto the surfaces of the magnetic acicular particles which are incorporated in a large amount into a magnetic recording layer thereof, is restricted to the specified range, an appropriate amount of myristic acid can be oozed onto the surface of the magnetic recording layer in a well-controlled condition for a long period of time, thereby effectively exhibiting a lubricating function thereof.

The reason why the magnetic recording medium of the first and second aspect of the present invention can show an excellent running durability, is considered by the present inventors as follows. That is, for the same reason as described above, an appropriate amount of myristic acid can be oozed onto the surface of the magnetic recording layer in a well-controlled condition, resulting in stable running durability of the magnetic recording medium.

Another point of the present invention is the fact that the magnetic recording medium of the third to sixth aspects which has a non-magnetic undercoat layer and is obtained by using the black magnetic acicular composite particles as magnetic particles, can exhibit a small light transmittance and a low surface electrical resistivity value even though the amount of carbon black incorporated in a magnetic recording layer thereof is reduced to as small a level as possible, and can be enhanced in surface smoothness of the magnetic recording layer.

The reason why the magnetic recording medium of the third to sixth aspects of the present invention can show a small light transmittance irrespective of a less amount of carbon black added thereto, is considered by the present inventors as follows. That is, carbon black fine particles usually tend to form agglomerates due to fineness thereof. However, in the black magnetic acicular composite particles of the present invention, since the carbon black fine particles can be uniformly and densely adhered in the form of the coating layer onto the surfaces of the core particles, carbon black can exhibit a function thereof more effectively.

The reason why the magnetic recording medium of the third to sixth aspects of the present invention can show a low surface electrical resistivity value irrespective of a less amount of carbon black added thereto, is considered by the present inventors as follows. That is, since the black magnetic acicular composite particles are uniformly dispersed in the coating film, the carbon black fine particles uniformly and densely adhered in the form of the coating layer onto the surfaces of the respective composite particles are continuously connected and contacted with each other in the coating film.

The reason why the magnetic recording medium of the third to sixth aspects of the present invention can show an excellent surface smoothness, is considered by the present inventors as follows. That is, in the black magnetic acicular composite particles of the present invention, the amount of carbon black fine particles desorbed or fallen-off from the surfaces of the particles is very small, and the amount of carbon black fine particles added into the magnetic recording layer of the magnetic recording medium can be reduced to as small a level as possible. For these reasons, the black magnetic acicular composite particles are prevented from being deteriorated in dispersibility in vehicle due to desorbed and liberated carbon black fine particles upon the production of magnetic coating composition. Further, the black magnetic acicular composite particles themselves are excellent in dispersibility in vehicle.

The magnetic recording medium of the third and fourth aspects according to the present invention in which the black magnetic acicular composite particles having a well-controlled myristic acid-adsorption are used, can exhibit a low friction coefficient and an excellent running durability.

The reason why the magnetic recording medium of the third and fourth aspects according to the present invention can be reduced in friction coefficient, is considered by the present inventors as follows. That is, by controlling the amount of myristic acid adsorbed onto the surfaces of the black magnetic acicular composite particles which are incorporated in a large amount into a magnetic recording layer of the magnetic recording medium, to the specified range, an appropriate amount of myristic acid can be oozed onto the surface of the magnetic recording layer in a well-controlled condition for a long period of time, thereby effectively exhibiting a good lubricating function thereof.

The reason why the magnetic recording medium of the third and fourth aspects of the present invention has an excellent running durability, is considered by the present inventors as follows. That is, for the same reason as described above, an appropriate amount of myristic acid can be oozed onto the surface of the magnetic recording layer in a well-controlled condition, resulting in stable running durability of the magnetic recording medium.

Further, the black magnetic acicular composite particles of the present invention can exhibit an excellent dispersibility in vehicle, a more excellent blackness, a lower volume resistivity value and a well-controlled myristic acid-adsorption. Therefore, when the particles are used for the production of magnetic recording medium, the obtained magnetic recording medium can exhibits a smooth surface, a more excellent blackness and a lower surface electrical resistivity value, and can be well-controlled in amount of myristic acid oozed onto the surface of a magnetic recording layer. Accordingly, the magnetic acicular composite particles of the present invention is suitable as magnetic acicular particles for magnetic recording media.

By using the above black magnetic acicular composite particles, the magnetic recording medium according to the present invention can exhibit not only a smooth surface, a smaller light transmittance and a lower surface electrical resistivity value, but also a small friction coefficient and an excellent running durability. Therefore, the magnetic recording medium of the present invention is suitable as those for high-density recording.

Also, in the magnetic recording medium of the third and fourth aspects of the present invention, the non-magnetic undercoat layer is formed, and the black magnetic acicular composite particles having an excellent blackness and a low volume resistivity value are used as magnetic particles therefor. Therefore, the obtained magnetic recording medium can exhibit a small light transmittance and a low surface electrical resistivity value. Further, since the amount of carbon black fine particles incorporated into the magnetic recording layer is reduced to as small a level as possible and the black magnetic acicular composite particles themselves are enhanced in dispersibility in vehicle, the obtained magnetic recording medium can exhibit a smooth surface. Accordingly, the magnetic recording medium of the present invention is suitable as those for high-density recording.

Further, the black magnetic acicular composite particles adhered with a large amount of carbon black, exhibit a well-controlled myristic acid-adsorption. Therefore, the magnetic recording medium of the present invention using the above black magnetic acicular composite particles as magnetic particles, can exhibit a small friction coefficient and an excellent running durability in addition to the above-described properties. Accordingly, the magnetic recording medium of the present invention is suitable as those for high-density recording.

EXAMPLES

The present invention is described in more detail by Examples and Comparative Examples, but the Examples are only illustrative and, therefore, not intended to limit the scope of the present invention.

Various properties were measured by the following methods.

(1) The average particle diameter, the average major axial diameter and average minor axial diameter of magnetic acicular particles, composite particles, black magnetic acicular composite particles and carbon black fine particles were respectively expressed by the average of values (measured in a predetermined direction) of about 350 particles which were sampled from a micrograph obtained by magnifying an original electron micrograph by four times in each of the longitudinal and transverse directions.

(2) The aspect ratio of the particles was expressed by the ratio of average major axial diameter to average minor axial diameter thereof.

(3) The geometrical standard deviation of particle diameter was expressed by values obtained by the following method. That is, the particle sizes were measured from the above magnified electron micrograph. The actual particle sizes and the number of the particles were calculated from the measured values. On a logarithmic normal probability paper, the particle sizes were plotted at regular intervals on the abscissa-axis and the accumulative number (under integration sieve) of particles belonging to each interval of the particle sizes were plotted by percentage on the ordinate-axis by a statistical technique.

The particle sizes corresponding to the number of particles of 50% and 84.13%, respectively, were read from the graph, and the geometrical standard deviation was calculated from the following formula:

Geometrical standard deviation={particle sizes corresponding to 84.13% under integration sieve}/{particle sizes (geometrical average diameter) corresponding to 50% under integration sieve}

The closer to 1 the geometrical standard deviation value, the more excellent the particle size distribution.

(4) The specific surface area was expressed by the value measured by a BET method.

(5) The amount of Al, Si and Co which were present within magnetic acicular particles, composite particles or black magnetic acicular composite particles, or on surfaces thereof, and the amount of Si contained in the organosilicon compounds, were measured by a fluorescent X-ray spectroscopy device 3063 M (manufactured by Rigaku Denki Kogyo Co., Ltd.) according to JIS K0119 "General rule of fluorescent X-ray analysis".

(6) The content of $Fe^{2+}$ in the core particles is expressed by the value measured by the following chemical analysis method.

That is, 25 ml of a mixed solution composed of phosphoric acid and sulfuric acid at a mixing ratio of 2:1, was added to 0.5 g of core particles, thereby dissolving the core particles in the mixed solution. After several droplets of diphenylamine sulfonic acid as an indicator was added to the diluted solution, the solution was subjected to oxidation-reduction titration using an aqueous potassium bichromate solution. The titration was terminated when the diluted solution exhibited a violet color. The amount of $Fe^{2+}$ was measured from the amount of the aqueous potassium bichromate solution used up to the termination of the titration.

(7) The amount of carbon black coat formed on the surface of the composite particles or black magnetic acicular composite particles was measured by "Horiba Metal, Carbon and Sulfur Analyzer EMIA-2200 Model" (manufactured by Horiba Seisakusho Co., Ltd.).

(8) The blackness of the magnetic acicular particles, composite particles and black filler was measured by the following method. That is, 0.5 g of sample particles and 1.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 6-mil (150 $\mu$m) applicator to produce a coating film piece (having a film thickness of about 30 $\mu$m). The thus obtained coating film piece was measured according to JIS Z 8729 by a multi-light source spectrographic calorimeter MSC-IS-2D (manufactured by Suga Testing Machines Manufacturing Co., Ltd.) to determine an L* value of colorimetric indices thereof. The blackness was expressed by the L* value measured.

Here, the L* value represents a lightness, and the smaller the L* value, the more excellent the blackness.

(9) The volume resistivity of the magnetic acicular particles, composite particles and the black magnetic acicular composite particles was measured by the following method.

That is, first, 0.5 g of the sample particles to be measured was weighted, and press-molded at 13,720 kPa (140 Kg/cm$^2$) using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was applied between the electrodes using a Wheatstone bridge (model 4329A, manufactured by Yokogawa-Hokushin Denki Co., Ltd.) to measure a resistance value R ($\Omega$).

The cylindrical test piece was measured with respect to an upper surface area A (cm$^2$) and a thickness $t_0$ (cm) thereof. The measured values were inserted into the following formula, thereby obtaining a volume resistivity X ($\Omega \cdot$cm).

$X(\Omega \cdot cm) = R \times (A/t_0)$

(10) The thickness of carbon black coat formed on the surfaces of the black magnetic acicular composite particles is expressed by the value which was obtained by first measuring an average thickness of carbon black coat formed onto the surfaces of the particles on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(11) The desorption percentage (T %) of carbon black desorbed from the composite particles or black magnetic acicular composite particles was measured by the following method.

That is, 3 g of the sample particles and 40 ml of ethanol were placed in a 50-ml precipitation pipe and then was subjected to ultrasonic dispersion for 20 minutes. Thereafter, the obtained dispersion was allowed to stand for 120 minutes, and separated the carbon black desorbed from the sample particles on the basis of the difference in specific gravity therebetween. Next, the thus separated sample particles were mixed again with 40 ml of ethanol, and the obtained mixture was further subjected to ultrasonic dispersion for 20 minutes. Thereafter, the obtained dispersion was allowed to stand for 120 minutes, thereby separating the sample particles and carbon black desorbed, from each other. The thus separated black magnetic acicular composite particles were dried at 100° C. for one hour, and then the carbon content thereof was measured by the "Horiba Metal, Carbon and Sulfur Analyzer EMIA-2200 Model" (manufactured by HORIBA SEISAKUSHO CO., LTD.). The desorption percentage (T %) was calculated according to the following formula:

$$T(\%) = \{(W_a - W_e)/W_a\} \times 100$$

wherein $W_a$ represents an amount of carbon black initially formed on the sample particles; and $W_e$ represents an amount of carbon black which still remains on the sample particles after the above desorption test.

The closer to zero the desorption percentage (T %), the smaller the amount of carbon black desorbed from the sample particles.

(12) The myristic acid absorption of the magnetic acicular particles, the composite particles and the black magnetic acicular composite particles was measured by the following method. The lower the myristic acid absorption, the more the fatty acid becomes to ooze on the surface of the magnetic recording layer and the lower the friction coefficient thereof.

100 g of 1.5 mmϕ glass beads, 9 g of sample particles to be measured and 45 ml of a tetrahydrofuran solution containing myristic acid in an amount enough to form one layer thereof on each sample particle, were charged into a 140-ml glass bottle, and then mixed and dispersed together for 60 minutes using a paint shaker.

Next, the thus obtained dispersion was taken out, charged into a 50-ml precipitation tube and centrifuged at 10,000 rpm for 15 minutes, thereby separating a solvent portion from a solid portion. The amount (concentration) of myristic acid contained in the solvent portion was determined by a gravimetric method. By subtracting the measured value from an amount of myristic acid initially charged, the amount of myristic acid contained in the solid portion was obtained as a myristic acid absorption (mg/m$^2$) of the particles to be measured.

(13) The viscosity of the coating composition was obtained by measuring the viscosity of the coating composition at 25° C. at a shear rate D of 1.92 sec$^{-1}$ by using "E type viscometer EMD-R" (manufactured by Tokyo Keiki, Co., Ltd.).

(14) The gloss of the surface of the coating film of the magnetic recording layer was measured at an angle of incidence of 45° by "glossmeter UGV-5D" (manufactured by Suga Shikenki, Co., Ltd.).

(15) The surface roughness Ra is expressed by the average value of the center-line average roughness of the profile curve of the surface of the coating film of the magnetic recording layer by using "Surfcom-575A" (manufactured by Tokyo Seimitsu Co., Ltd.).

(16) The strength of the coating film was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(17) The magnetic properties of the magnetic particles and magnetic recording medium were measured under an external magnetic field of 795.8 kA/m (10 kOe) by "Vibration Sample Magnetometer VSM-3S-15 (manufactured by Toei Kogyo, Co., Ltd.)".

(18) The light transmittance is expressed by the linear adsorption coefficient calculated by substituting the light transmittance measured by using "UV-Vis Recording Spectrophotometer UV-2100" (manufactured by Shimazu Seisakusho, Ltd.) for the following formula. The larger the value, the more difficult it is for the magnetic recording medium to transmit light:

$$\text{Linear adsorption coefficient } (\mu m^{-1}) = \{ln(I/t)\}/FT$$

wherein t represents a light transmittance (−) at λ=900 nm, and FT represents thickness (μm) of the coating film used for the measurement.

(19) The surface electrical resistivity of the coating film of the magnetic recording layer was measured by the following method. That is, the coating film to be measured was exposed to the environment maintained at a temperature of 25° C. and a relative humidity of 60%, for not less than 12 hours. Thereafter, the coating film was slit into 6 mm width, and the slit coating film was placed on two metal electrodes having a width of 6.5 mm such that a coating surface thereof was contacted with the electrodes. 1.67 N (170 gw) were respectively suspended at opposite ends of the coating film so as to bring the coating film into close contact with the electrodes. D.C. 500 V was applied between the electrodes, thereby measuring the surface electrical resistivity of the coating film.

(20) The friction coefficient of the magnetic recording medium was determined by measuring a frictional force between a surface of the magnetic tape and a metal surface (aluminum polished surface) using a tensile tester TENSILON (manufactured by Shimadzu Seisakusho Co., Ltd.), and expressed by the ratio of the measured value to the load.

(21) The durability of the magnetic medium was evaluated by the following running durability and the head contamination.

The running durability was evaluated by the actual operating time under the conditions that the load was 1.96 N (200 gw) and the relative speed of the head and the tape was 16 m/s by using "Media Durability Tester MDT-3000" (manufactured by Steinberg Associates). The longer the actual operating time, the higher the running durability.

The head contamination was evaluated by visually observing the magnetic head after running the magnetic tape under a load of 1.96 N (200 gw) for 30 minutes by setting a relative speed between the magnetic tape and the magnetic head to 16 m/s, using a MEDIA DURABILITY TESTER MDT-3000 (manufactured by Steinberg Associates Co. Ltd.). The evaluation results were classified into the following four ranks. The A rank represents the smallest head contamination.

A: Not contaminated
B: Slightly contaminated
C: Contaminated
D: Severely contaminated

(22) The thickness of each of the non-magnetic base film, the non-magnetic undercoat layer and the magnetic recording layer constituting the magnetic recording medium was measured in the following manner by using "Digital Electronic Micrometer R351C" (manufactured by Anritsu Corp.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Meanwhile, the thicknesses of non-magnetic base film and magnetic recording layer of a magnetic recording medium were measured by the following method.

The thickness (A) of the non-magnetic base film was first measured by a digital electron micrometer "K351C" (manufactured by Anritsu Denki Co., Ltd.). After forming a magnetic recording layer on the non-magnetic base film, a thickness (B) of the thus obtained magnetic recording medium (a total thickness of the non-magnetic base film and the magnetic recording layer) was measured by the same method as used above. Then, the thickness of the magnetic recording layer is obtained by subtracting (A) from (B).

Example 1

Production of Black Magnetic Acicular Composite Particles 20 kg of acicular cobalt-coated magnetite particles (cobalt content: 2.38% by weight based on the weight of the acicular cobalt-coated magnetite particles; $Fe^{2+}$ content: 15.5% by weight based on the weight of the acicular cobalt-coated magnetite particles; average major axis diameter: 0.264 μm; average minor axis diameter: 0.0334 μm; aspect ratio: 7.9:1; geometrical standard deviation value: 1.36; BET specific surface area value: 37.8 m$^2$/g; blackness (L* value): 22.8; volume resistivity: $6.8 \times 10^7$ Ω·cm; myristic acid absorption: 0.78 mg/m$^2$; coercive force value: 683 Oe (54.4 kA/m); saturation magnetization value: 81.3 emu/g (81.3 Am$^2$/kg)), were deagglomerated in 150 liters of pure water using a stirrer, and further passed through a "TK pipeline homo-mixer" (tradename, manufactured by Tokushu Kika Kogyo Co., Ltd.) three times, thereby obtaining a slurry containing the acicular cobalt-coated magnetite particles.

Successively, the obtained slurry containing the acicular cobalt-coated magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the acicular cobalt-coated magnetite particles were dispersed.

The particles in the obtained slurry which remained on a sieve of 325 meshes (mesh size: 44 μm) was 0%. The slurry was filtered and washed with water, thereby obtaining a filter cake containing the acicular cobalt-coated magnetite particles. After the obtained filter cake containing the acicular cobalt-coated magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm (294 N/cm) and a stirring speed of 22 rpm for 15 minutes, while introducing nitrogen gas thereinto at a rate of 2 liter/minute, thereby lightly deagglomerating the particles.

330 g of methyltriethoxysilane (tradename: "TSL8123", produced by GE TOSHIBA SILICONE CO., LTD.) was mixed and diluted with 200 ml of ethanol to obtain a methyltriethoxysilane solution. The methyltriethoxysilane solution was added to the deagglomerated acicular cobalt-coated magnetite particles under the operation of the edge runner. The acicular cobalt-coated magnetite particles were continuously mixed and stirred at a linear load of 30 Kg/cm (294 N/cm) and a stirring speed of 22 rpm for 20 minutes.

Next, 2,200 g of carbon black fine particles A (particle shape: granular shape; average particle size: 0.022 μm; geometrical standard deviation value: 1.68; BET specific surface area value: 134 m$^2$/g; and blackness (L* value): 16.6; pH value: 3.4; DBP oil absorption: 89 ml/100 g) were added to the acicular cobalt-coated magnetite particles coated with methyltriethoxysilane for 40 minutes while operating the edge runner. Further, the mixed particles were continuously stirred at a linear load of 45 Kg/cm (441 N/cm) and a stirring speed of 22 rpm for 45 minutes to form the carbon black coat on the coating layer composed of methyltriethoxysilane, thereby obtaining composite particles.

The obtained black magnetic acicular composite particles were heat-treated at 80° C. for 120 minutes by using a. As shown in the electron micrograph, the resultant black magnetic acicular composite particles had an average major axis diameter of 0.270 μm, an average minor axis diameter of 0.0341 μm an aspect ratio of 7.9:1. In addition, the black magnetic acicular composite particles showed a geometrical standard deviation value of 1.36, a BET specific surface area value of 42.3 m$^2$/g, a blackness (L* value) of 18.8 and a volume resistivity of $4.9 \times 10^4$ Ω·cm, a myristic acid-adsorption of 0.27 mg/m$^2$ and a carbon black desorption percentage of 7.7%. As to the magnetic properties, the coercive force value of the black magnetic acicular composite particles was 678 Oe (54.0 kA/m) and the saturation magnetization value was 73.4 emu/g (73.4 kA/m).

Further, it was confirmed that the amount of carbon black adhered and bonded was 16.50% by weight (calculated as C; corresponding to 20.0 parts by weight based on 100 parts by weight of the core particles); the thickness of carbon black adhered on the surface of each particle was 0.0020 μm; and the coating amount of the organosilane compounds produced from methyltriethoxysilane was 0.46% by weight (calculated as Si). Meanwhile, as a result of the observation by electron microscope, it was recognized that since substantially no liberated carbon black was observed, almost whole amount of carbon black added was adhered onto the coating layer composed of organosilane compounds produced from methyltriethoxysilane.

Production of Magnetic Recording Medium: Formation of Magnetic Recording Layer 12 g of the thus obtained black magnetic acicular composite particles, 1.2 g of a polishing agent (AKP-30: trade name, produced by Sumitomo Chemical Co., Ltd.), 0.06 g of carbon black (#2400B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Black magnetic acicular composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#2400B) | 0.5 parts by weight |
| Lubricant (myristic acid:butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The viscosity of the obtained magnetic coating composition was 2,242 cP.

The magnetic coating composition obtained was applied to a polyethylene terephthalate film (thickness: 12 $\mu$m) as a non-magnetic base film to a thickness of 45 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch (1.27 cm), thereby obtaining a magnetic tape. The thickness of the respective magnetic recording layer was 3.5 $\mu$m.

The coercive force value of the magnetic tape produced by forming a magnetic recording layer on the non-magnetic base film was 730 Oe (58.1 kA/m), the squareness (Br/Bm) thereof was 0.89, the gloss thereof was 175%, the surface roughness Ra thereof was 7.7 nm, the linear absorption coefficient thereof was 2.78 $\mu m^{-1}$, a Young's modulus (relative value to a commercially available video tape: and AV T-120 produced by Victor Company of Japan, Limited) thereof was 133 and the surface electrical resistivity was 9.5×10$^6$ $\Omega$/cm$^2$. The friction coefficient thereof was 0.26. Further, as to the durability of the magnetic tape, the running durability time was not less than 28.1 minutes.

Core Particles 1 and 2

Magnetic acicular particles were prepared by known methods. The same procedure as defined in Example 1 was conducted by using the thus magnetic acicular particles, thereby obtaining deagglomerated magnetic acicular particles as core particles.

Various properties of the thus obtained magnetic acicular particles are shown in Table 1.

Core Particles 3

The same procedure as defined in Example 1 was conducted by using 20 kg of the deagglomerated acicular cobalt-coated maghemite particles (core particles 1) and 150 liters of water, thereby obtaining a slurry containing the acicular cobalt-coated maghemite particles. The pH value of the obtained re-dispersed slurry containing the acicular cobalt-coated maghemite particles was adjusted to 10.5 by adding an aqueous sodium hydroxide solution, and then the concentration of the slurry was adjusted to 98 g/liter by adding water thereto. After 150 liters of the slurry was heated to 60° C., 5,444 ml of a 1.0 mol/liter sodium aluminate solution (equivalent to 1.0% by weight (calculated as Al) based on the weight of the acicular cobalt-coated maghemite particles) was added to the slurry. After allowing the slurry to stand for 30 minutes, the pH value of the slurry was adjusted to 7.5 by adding an aqueous acetic acid solution. After further allowing the slurry to stand for 30 minutes, the slurry was subjected to filtration, washing with water, drying and pulverization, thereby obtaining the acicular cobalt-coated maghemite particles coated with hydroxides of aluminum.

Main production conditions are shown in Table 2, and various properties of the obtained acicular cobalt-coated maghemite particles are shown in Table 3.

Core Particles 4

The same procedure as defined in the production of the core particles 1 above, was conducted except that kind of core particles, and kind and amount of additives used in the surface treatment were varied, thereby obtaining surface-treated magnetic acicular particles.

Main production conditions are shown in Table 2, and various properties of the obtained surface-treated magnetic acicular particles are shown in Table 3.

In Table 2, "A" denotes a hydroxide of aluminum and "S" denotes an oxide of silicon.

Examples 2 to 4

The same procedure as defined in Example 1 was conducted except that kind of core particles, kind and amount of alkoxysilane or polysiloxane upon the coating step, edge runner treatment conditions used in the coating step, kind and amount of carbon black fine particles added in the carbon black coat forming steps and edge runner treatment conditions used in the carbon black coat forming steps, were changed variously, thereby obtaining composite particles.

Various properties of the carbon black fine particles A to B used, are shown in Table 4. The essential treating conditions are shown in Table 5, and various properties of the obtained composite particles are shown in Table 6.

As a result of observing the composite particles obtained in Examples 2 to 4 by an electron microscope, substantially no liberated carbon black was recognized. Therefore, it was confirmed that almost whole amount of carbon black added was adhered onto the coating layer of organosilane compounds produced from alkoxysilane, or the coating layer of polysiloxane.

Meanwhile, all the additives used in Example 2 were polysiloxanes. Specifically, "TSF484" (tradename, produced by Toshiba Silicone Co., Ltd.) was methyl hydrogen polysiloxane.

Examples 5 to 7

Production of Magnetic Recording Medium

The same procedure as defined in Example 1 was conducted except for varying the kind of the black magnetic acicular composite particles, thereby producing a magnetic recording medium.

The main producing conditions and various properties are shown in Tables 9 to 10.

TABLE 1

| Core particles | Kind of core particles | Properties of core particles Particle shape |
|---|---|---|
| Core particles 1 | Cobalt-coated maghemite particles (Co content: 2.65 wt. %) | Acicular |
| Core particles 2 | Cobalt-coated maghemite particles (Co content: 4.23 wt. %) | Spindle-shaped |

| Core particles | Properties of core particles | | |
|---|---|---|---|
| | Average major axial diameter ($\mu$m) | Average minor axial diameter ($\mu$m) | Aspect ratio (–) |
| Core particles 1 | 0.273 | 0.0334 | 8.2:1 |
| Core particles 2 | 0.210 | 0.0285 | 7.4:1 |

| Core particles | Properties of core particles | | | |
|---|---|---|---|---|
| | Geometrical standard deviation value (–) | BET specific surface area value ($m^2$/g) | Coercive force value (kA/m) | (Oe) |
| Core particles 1 | 1.39 | 36.0 | 54.9 | 690 |
| Core particles 2 | 1.36 | 40.4 | 67.1 | 843 |

| Core particles | Properties of core particles | | |
|---|---|---|---|
| | Saturation magnetization value (A$m^2$/kg) | (emu/g) | Volume resistivity value ($\Omega \cdot$ cm) |
| Core particles 1 | 76.4 | 76.4 | $6.5 \times 10^8$ |
| Core particles 2 | 78.7 | 78.7 | $3.6 \times 10^8$ |

| Core particles | Properties of core particles | |
|---|---|---|
| | Blackness (L* value) (–) | Myristic acid adsorption (mg/$m^2$) |
| Core particles 1 | 24.3 | 0.78 |
| Core particles 2 | 25.6 | 0.83 |

TABLE 2

| Core particles | Kind of core particles | Surface-treatment step Additives | | |
|---|---|---|---|---|
| | | Kind | Calculated as | Amount (wt. %) |
| Core particles 3 | Core particles 1 | Sodium aluminate | Al | 1.0 |
| Core particles 4 | Core particles 2 | Water glass #3 | $SiO_2$ | 0.75 |

| Core particles | Surface-treatment step Coating composition | | |
|---|---|---|---|
| | Kind | Calculated as | Amount (wt. %) |
| Core particles 3 | A | Al | 0.98 |
| Core particles 4 | S | $SiO_2$ | 0.72 |

TABLE 3

| Core particles | Properties of surface-treated magnetic acicular particles | | |
|---|---|---|---|
| | Average major axial diameter ($\mu$m) | Average minor axial diameter ($\mu$m) | Aspect ratio (–) |
| Core particles 3 | 0.273 | 0.0334 | 8.2:1 |
| Core particles 4 | 0.210 | 0.0285 | 7.4:1 |

| Core particles | Properties of surface-treated magnetic acicular particles | | | |
|---|---|---|---|---|
| | Geometrical standard deviation value (–) | BET specific surface area value ($m^2$/g) | Coercive force value (kA/m) | (Oe) |
| Core particles 3 | 1.40 | 36.4 | 54.6 | 686 |
| Core particles 4 | 1.35 | 40.9 | 66.4 | 834 |

| Core particles | Properties of surface-treated magnetic acicular particles | | |
|---|---|---|---|
| | Saturation magnetization value (A$m^2$/kg) | (emu/g) | Volume resistivity value ($\Omega \cdot$ cm) |
| Core particles 3 | 75.9 | 75.9 | $7.2 \times 10^8$ |
| Core particles 4 | 78.3 | 78.3 | $4.5 \times 10^8$ |

| Core particles | Properties of surface-treated magnetic acicular particles | |
|---|---|---|
| | Blackness (L* value) (–) | Myristic acid adsorption (mg/$m^2$) |
| Core particles 3 | 24.3 | 0.57 |
| Core particles 4 | 25.6 | 0.63 |

TABLE 4

Properties of carbon black fine particles

| Kind of carbon black fine particles | Particle shape | Average particle size (μm) | Geometrical standard deviation value (-) |
|---|---|---|---|
| Carbon black A | Granular | 0.022 | 1.68 |
| Carbon black B | Granular | 0.030 | 2.06 |

Properties of carbon black fine particles

| Kind of carbon black fine particles | BET specific surface area value (m²/g) | pH value (-) | DBP oil absorption (ml/100 g) | Blackness (L* value) (-) |
|---|---|---|---|---|
| Carbon black A | 134.0 | 3.4 | 89 | 16.6 |
| Carbon black B | 84.6 | 9.0 | 95 | 17.0 |

TABLE 5

Production of black magnetic acicular composite particles
Coating step with alkoxysilane, polysiloxane or silicon compound
Additives

| Examples | Kind of core particles | Kind | Amount added (part by weight) |
|---|---|---|---|
| Example 2 | Core particles 1 | TSF484 | 2.0 |
| Example 3 | Core particles 3 | Methyl trimethoxysilane | 4.0 |
| Example 4 | Core particles 4 | Dimethyldimethoxy-silane | 2.5 |

Production of black magnetic acicular composite particles
Coating step with alkoxysilane, polysiloxane or silicon compound

| | Edge runner treatment | | Coating amount (calculated as Si) |
|---|---|---|---|
| Examples | Linear load (N/cm) | Linear load (Kg/cm) | Time (min.) | (wt. %) |
| Example 2 | 294 | 30 | 20 | 0.817 |
| Example 3 | 392 | 40 | 30 | 0.793 |
| Example 4 | 294 | 30 | 30 | 0.570 |

Production of black magnetic acicular composite particles
Coat formation step with carbon black
Carbon black

| Examples | Kind | Amount added (part by weight) | Adding time (min.) |
|---|---|---|---|
| Example 2 | A | 15.0 | 30 |
| Example 3 | B | 30.0 | 60 |
| Example 4 | A | 25.0 | 50 |

TABLE 5-continued

Production of black magnetic acicular composite particles
Coat formation step with carbon black

| | Edge runner treatment | | | Amount adhered (calculated as C) |
|---|---|---|---|---|
| Examples | Linear load (N/cm) | Linear load (Kg/cm) | Time (min.) | (wt. %) |
| Example 2 | 294 | 30 | 30 | 12.86 |
| Example 3 | 588 | 60 | 40 | 22.91 |
| Example 4 | 441 | 45 | 30 | 20.08 |

TABLE 6

Properties of black magnetic acicular composite particles

| Examples | Average major axial diameter (μm) | Average minor axial diameter (μm) | Aspect ratio (-) |
|---|---|---|---|
| Example 2 | 0.278 | 0.0338 | 8.2:1 |
| Example 3 | 0.280 | 0.0341 | 8.2:1 |
| Example 4 | 0.216 | 0.0292 | 7.4:1 |

Properties of black magnetic acicular composite particles

| Examples | Geometrical standard deviation value (-) | BET specific surface area value (m²/g) | Coercive force value (kA/m) | Coercive force value (Oe) |
|---|---|---|---|---|
| Example 2 | 1.39 | 39.9 | 52.8 | 663 |
| Example 3 | 1.36 | 42.7 | 52.0 | 654 |
| Example 4 | 1.41 | 43.5 | 64.5 | 811 |

Properties of black magnetic acicular composite particles

| Examples | Saturation magnetization value (Am²/kg) | Saturation magnetization value (emu/g) | Volume resistivity value (Ω·cm) | Blackness (L* value) (-) |
|---|---|---|---|---|
| Example 2 | 71.8 | 71.8 | 2.2 × 10⁴ | 19.0 |
| Example 3 | 68.3 | 68.3 | 8.6 × 10³ | 18.6 |
| Example 4 | 72.1 | 72.1 | 1.5 × 10⁴ | 18.4 |

Properties of black magnetic acicular composite particles

| Examples | Myristic acid adsorption (mg/m²) | Carbon black desorption percentage (%) |
|---|---|---|
| Example 2 | 0.26 | 7.4 |
| Example 3 | 0.22 | 4.7 |
| Example 4 | 0.23 | 4.4 |

TABLE 7

| Examples | Production of magnetic recording medium | | | Properties of coating |
|---|---|---|---|---|
| | Kind of black magnetic acicular composite particles | Weight ratio of particles to resin (−) | | composition Viscosity (cP) |
| Example 5 | Example 2 | 5.0:1 | | 2,150 |
| Example 6 | Example 3 | 5.0:1 | | 2,184 |
| Example 7 | Example 4 | 5.0:1 | | 2,210 |

Properties of magnetic recording medium

| Examples | Thickness of magnetic layer ($\mu$m) | Coercive force value (kA/m) | (Oe) | Squareness (Br/Bm) (−) |
|---|---|---|---|---|
| Example 5 | 3.4 | 59.7 | 750 | 0.88 |
| Example 6 | 3.6 | 59.3 | 745 | 0.88 |
| Example 7 | 3.5 | 70.6 | 887 | 0.89 |

Properties of magnetic recording medium

| Examples | Gloss (%) | Surface roughness Ra (nm) | Young's modulus (relative value) |
|---|---|---|---|
| Example 5 | 178 | 7.6 | 133 |
| Example 6 | 183 | 7.3 | 135 |
| Example 7 | 181 | 7.1 | 136 |

Properties of magnetic recording medium

| Examples | Linear absorption ($\mu m^{-1}$) | Friction coefficient (−) |
|---|---|---|
| Example 5 | 2.73 | 0.27 |
| Example 6 | 2.88 | 0.23 |
| Example 7 | 2.84 | 0.24 |

Properties of magnetic recording medium

| Examples | Running durability (min.) | Surface electrical resistivity value ($\Omega/cm^2$) |
|---|---|---|
| Example 5 | 28.5 | $3.1 \times 10^6$ |
| Example 6 | ≥30 | $1.5 \times 10^6$ |
| Example 7 | ≥30 | $2.0 \times 10^6$ |

Example 8
Production of Black Magnetic Acicular Composite Particles 20 kg of acicular cobalt-coated magnetite particles (cobalt content: 2.33% by weight based on the weight of the acicular cobalt-coated magnetite particles; $Fe^{2+}$ content: 15.4% by weight based on the weight of the acicular cobalt-coated magnetite particles; average major axis diameter: 0.270 $\mu$m; average minor axis diameter: 0.0329 $\mu$m; aspect ratio: 8.2:1; geometrical standard deviation value: 1.36; BET specific surface area value: 38.9 $m^2$/g; blackness (L* value): 22.5; volume resistivity: $7.4 \times 10^7$ $\Omega$·cm; myristic acid absorption: 0.79 mg/$m^2$; coercive force value: 698 Oe (55.5 kA/m); saturation magnetization value: 80.6 emu/g (80.6 $Am^2$/kg)), were deagglomerated in 150 liters of pure water using a stirrer, and further passed through a "TK pipeline homo-mixer" (tradename, manufactured by Tokushu Kika Kogyo Co., Ltd.) three times, thereby obtaining a slurry containing the acicular cobalt-coated magnetite particles.

Successively, the obtained slurry containing the acicular cobalt-coated magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the acicular cobalt-coated magnetite particles were dispersed.

The particles in the obtained slurry which remained on a sieve of 325 meshes (mesh size: 44 $\mu$m) was 0%. The slurry was filtered and washed with water, thereby obtaining a filter cake containing the acicular cobalt-coated magnetite particles. After the obtained filter cake containing the acicular cobalt-coated magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm (294 N/cm) and a stirring speed of 22 rpm for 15 minutes, while introducing nitrogen gas thereinto at a rate of 2 liter/minute, thereby lightly deagglomerating the particles.

220 g of methyltriethoxysilane (tradename: "TSL8123", produced by GE TOSHIBA SILICONE CO., LTD.) was mixed and diluted with 200 ml of ethanol to obtain a methyltriethoxysilane solution. The methyltriethoxysilane solution was added to the deagglomerated acicular cobalt-coated magnetite particles under the operation of the edge runner. The acicular cobalt-coated magnetite particles were continuously mixed and stirred at a linear load of 40 Kg/cm (392 N/cm) and a stirring speed of 22 rpm for 20 minutes.

Next, 1,650 g of carbon black fine particles B (particle shape: granular shape; average particle size: 0.030 $\mu$m; geometrical standard deviation value: 2.06; BET specific surface area value: 84.6 $m^2$/g; and blackness (L* value): 17.0; pH value: 8.0; DBP oil absorption: 95 ml/100 g) were added to the acicular cobalt-coated magnetite particles coated with methyltriethoxysilane for 30 minutes while operating the edge runner. Further, the mixed particles were continuously stirred at a linear load of 30 Kg/cm (294 N/cm) and a stirring speed of 22 rpm for 30 minutes to form the carbon black coat on the coating layer composed of methyltriethoxysilane, thereby obtaining black magnetic acicular composite particles.

The obtained black magnetic acicular composite particles were heat-treated at 80° C. for 120 minutes by using a drier. As shown in the electron micrograph, the resultant black magnetic acicular composite particles had an average major axis diameter of 0.276 $\mu$m, an average minor axis diameter of 0.0337 $\mu$m, an aspect ratio of 8.2:1. In addition, the black magnetic acicular composite particles showed a geometrical standard deviation value of 1.37, a BET specific surface area value of 41.6 $m^2$/g, a blackness (L* value) of 19.5 and a volume resistivity of $7.1 \times 10^4$ $\Omega$·cm, and a carbon black desorption percentage of 7.9%. As to the magnetic properties, the coercive force value of the black magnetic acicular composite particles was 677 Oe (53.9 kA/m) and the saturation magnetization value was 78.9 emu/g (78.9 $Am^2$/kg).

Further, it was confirmed that the total amount of carbon black adhered and bonded was 12.99% by weight (calculated as C; corresponding to 15.0 parts by weight based on 100 parts by weight of the core particles); the thickness of carbon black coat on the surface of each particle was 0.0019 $\mu$m; and the coating amount of methyltriethoxysilane was 0.31% by weight (calculated as Si). Meanwhile, as a result of the observation by electron microscope, it was recognized that since substantially no liberated carbon black was observed, almost whole amount of carbon black added was adhered onto the coating layer of organosilane compounds produced from methyltriethoxysilane.

Production of Non-magnetic Undercoat Layer 12 g of non-magnetic particles 1 (kind: hematite particles; particle shape: spindle-shaped; average major axial diameter: 0.187 μm; average minor axial diameter: 0.0240 μm; aspect ratio: 7.8:1; geometrical standard deviation value: 1.33; BET specific surface area value: 43.3 m²/g; volume resistivity value: 8.6×10⁸ Ω·cm; blackness (L* value): 32.6) were mixed with a binder resin solution (containing 30% by weight of vinyl chloride-vinyl acetate copolymer resin having a sodium sulfonate group and 70% by weight of cyclohexanone) and cyclohexanone, thereby obtaining a mixture (solid content: 72%). The obtained mixture was further kneaded for 30 minutes using a plastomill, thereby obtaining a kneaded material.

The thus obtained kneaded material was added to a 140 ml glass bottle together with 95 g of 1.5 mmφ glass beads, an additional amount of a binder resin solution (containing 30% by weight of polyurethane resin having a sodium sulfonate group and 70% by weight of a mixed solvent of methyl ethyl ketone and toluene (1:1)), cyclohexanone, methyl ethyl ketone and toluene. The resultant mixture was mixed and dispersed for 6 hours by a paint shaker, thereby obtaining a coating composition. Thereafter, a lubricant was added to the obtained coating composition, and the mixture was mixed and dispersed for 15 minutes by a paint shaker.

The composition of the obtained non-magnetic coating composition was as follows:

| | |
|---|---|
| Non-magnetic particles 1 | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid: butyl stearate = 1:1) | 2 parts by weight |
| Cyclohexanone | 56.9 parts by weight |
| Methyl ethyl ketone | 142.3 parts by weight |
| Toluene | 85.4 parts by weight |

The obtained non-magnetic coating composition had a viscosity of 310 cP.

Next, the non-magnetic coating composition was coated on a 12 μm-thick polyethylene terephthalate film using an applicator so as to form thereon a 55 μm-thick coating layer, and then dried, thereby producing a non-magnetic undercoat layer.

The thus obtained non-magnetic undercoat layer had a thickness of 3.4 μm, and exhibited a gloss of 193%, a surface roughness Ra of 8.2 nm, a Young's modulus (relative value) of 123, a linear absorption of 1.01 μm⁻¹ and a surface electrical resistivity value of 1.1×10¹⁴ Ω·cm.

Production of Magnetic Recording Medium: Formation of Magnetic Recording Layer 12 g of the thus obtained black magnetic acicular composite particles, 1.2 g of a polishing agent (AKP-30: trade name, produced by Sumitomo Chemical Co., Ltd.), 0.06 g of carbon black fine particles (#2400B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm) glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Black magnetic acicular composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black fine particles (#2400B) | 0.5 parts by weight |
| Lubricant (myristic acid:butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The viscosity of the obtained magnetic coating composition was 2,560 cP.

The magnetic coating composition obtained was applied to the above-mentioned non-magnetic undercoat layer to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 1.1 μm.

The coercive force value of the magnetic tape produced by forming a magnetic recording layer on the non-magnetic base film was 737 Oe (58.7 kA/m), the squareness (Br/Bm) thereof was 0.89, the gloss thereof was 177%, the surface roughness Ra thereof was 7.2 nm, the Young's modulus (relative value) thereof was 137, the linear absorption coefficient thereof was 1.55 μm⁻¹, and the surface electrical resistivity was 4.3×10⁷ Ω/cm². The friction coefficient thereof was 0.27. Further, as to the durability of the magnetic tape, the running durability time was not less than 29.3 minutes.

What is claimed is:

1. A magnetic recording medium comprising:
a non-magnetic base film; and
a magnetic recording layer comprising a binder resin and black magnetic acicular composite particles having an average particle diameter of 0.051 to 0.35 μm, comprising
as magnetic acicular particles, magnetic acicular cobalt-coated iron oxide particles or magnetic acicular metal particles containing iron as a main component,
a coating formed on the surface of said magnetic acicular particle, comprising at least one organosilicon compound selected from the group consisting of:
(1) organosilane compounds obtainable from alkoxysilane compounds, and
(2) polysiloxanes or modified polysiloxanes, and
a single carbon black coat formed on said coating layer comprising said organosilicon compound, in an amount of from more than 10 to 40 parts by weight based on 100 parts by weight of said magnetic acicular particles.

2. A magnetic recording medium according to claim 1, wherein said magnetic acicular particles are particles having a coat which is formed on at least a part of the surface of said magnetic acicular particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the magnetic acicular particles coated.

3. A magnetic recording medium according to claim 1, wherein said modified polysiloxanes are compounds selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

4. A magnetic recording medium according to claim 1, wherein said alkoxysilane compound is represented by the general formula (I):

$$R^1_a SiX_{4-a} \quad (I)$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

5. A magnetic recording medium according to claim 4, wherein said alkoxysilane compound is methyltriethoxysilane, dimethyldiethoxysilane, phenyltriethoxysilane, diphenyldiethoxysilane, methyltrimethoxysilane, dimethyldimethoxysilane, phenyltrimethoxysilane, diphenyldimethoxysilane, isobutyltrimethoxysilane or decyltrimethoxysilane.

6. A magnetic recording medium according to claim 1, wherein said polysiloxanes are represented by the general formula (II):

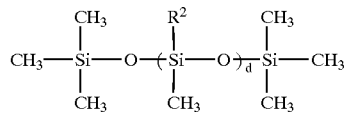

wherein $R^2$ is H— or $CH_3$—, and d is an integer of 15 to 450.

7. A magnetic recording medium according to claim 6, wherein said polysiloxanes are compounds having methyl hydrogen siloxane units.

8. A magnetic recording medium according to claim 3, wherein said polysiloxanes modified with at least one compound selected from the group consisting of polyethers, polyesters and epoxy compounds are represented by the general formula (III), (IV) or (V):

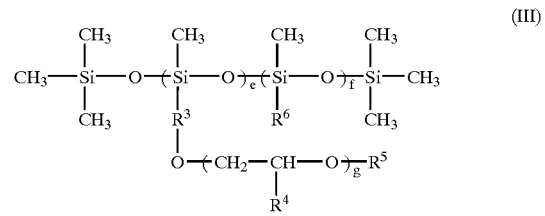

wherein $R^3$ is —$(—CH_2—)_h$—; $R^4$ is —$(—CH_2—)_i$—$CH_3$; $R^5$ is —OH, —COOH, —CH=$CH_2$, —$C(CH_3)$=$CH_2$ or —$(—CH_2—)_j$—$CH_3$; $R^6$ is —$(—CH_2—)_k$—$CH_3$; g and h are an integer of 1 to 15; i, j and k are an integer of 0 to 15; e is an integer of 1 to 50; and f is an integer of 1 to 300;

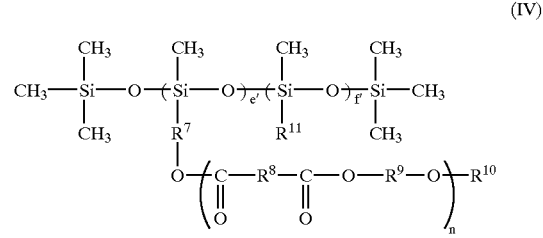

wherein $R^7$, $R^8$ and $R^9$ are —$(—CH_2—)_q$— and may be the same or different; $R^{10}$ is —OH, —COOH, —CH=$CH_2$, —$C(CH_3)$=$CH_2$ or —$(—CH_2—)_r$—$CH_3$; $R^{11}$ is —$(—CH_2—)_s$—$CH_3$; n and q are an integer of 1 to 15; r and s are an integer of 0 to 15; e' is an integer of 1 to 50; and f' is an integer of 1 to 300; or

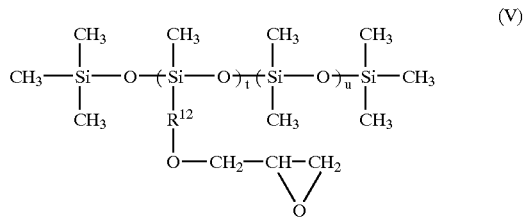

wherein $R^{12}$ is —$(—CH_2—)_v$—; v is an integer of 1 to 15; t is an integer of 1 to 50; and u is an integer of 1 to 300.

9. A magnetic recording medium according to claim 3, wherein said polysiloxanes whose molecular terminal is modified with at least one group selected from the group consisting of carboxylic acid groups, alcohol groups and a hydroxyl group are represented by the general formula (VI):

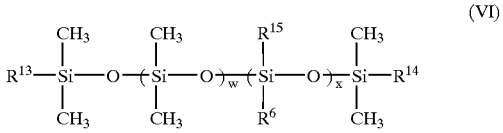

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —$(—CH_2—)_y$—; y is an integer of 1 to 15; w is an integer of 1 to 200; and x is an integer of 0 to 100.

10. A magnetic recording medium according to claim 1, wherein the amount of said coating organosilicon compounds is 0.02 to 5.0% by weight, calculated as Si, based on the total weight of the organosilicon compounds and said magnetic acicular particles.

11. A magnetic recording medium according to claim 1, wherein the thickness of said carbon black coat is not more than 0.06 μm.

12. A magnetic recording medium according to claim 1, wherein said black magnetic acicular composite particles have an absorption amount of myristic acid of 0.01 to 0.3 mg/m².

13. A magnetic recording medium according to claim 1, wherein said black magnetic acicular composite particles have an aspect ratio (average major axis diameter/average minor axis diameter) of 2.0:1 to 20.0:1.

14. A magnetic recording medium according to claim 1, wherein said black magnetic acicular composite particles have a BET specific surface area value of 21 to 160 m²/g.

15. A magnetic recording medium according to claim 1, wherein said black magnetic acicular composite particles have a blackness (L* value) of 15 to 22.

16. A magnetic recording medium according to claim 1, wherein said black magnetic acicular composite particles have a volume resistivity of not more than $1.0 \times 10^6$ Ω·cm.

17. A magnetic recording medium according to claim 1, wherein said black magnetic acicular composite particles have a geometrical standard deviation of major axis diameter of 1.01 to 2.0.

18. A magnetic recording medium according to claim 1, which further comprises a gloss of coating film of 165 to 300%, a surface roughness Ra of coating film of not more than 11.5 nm, a linear absorption of coating film of 1.75 to 10.0 $\mu m^{-1}$, and a surface electrical resistivity of not more than $1.0 \times 10^8$ Ω/cm².

19. A magnetic recording medium according to claim 1 or 2, which further comprises a non-magnetic undercoat layer disposed between said non-magnetic base film and said magnetic recording layer.

20. A magnetic recording medium according to claim 19, which further comprises a gloss of coating film of 165 to 300%, a surface roughness Ra of coating film of not more than 11.0 nm, a linear absorption of coating film of 1.80 to 10.0 $\mu m^{-1}$, and a surface electrical resistivity of not more than $1.0 \times 10^8$ Ω/cm².

* * * * *